US010871464B2

(12) United States Patent
Ishige et al.

(10) Patent No.: US 10,871,464 B2
(45) Date of Patent: Dec. 22, 2020

(54) ION-SELECTIVE ELECTRODE, METHOD OF MANUFACTURE THEREOF, AND CARTRIDGE

(71) Applicant: Hitachi High-Tech Corporation, Tokyo (JP)

(72) Inventors: Yu Ishige, Tokyo (JP); Wolfgang Schuhmann, Bochum (DE); Stefan Klink, Bochum (DE)

(73) Assignee: Hitachi High-Tech Corporation, Tokyo (JP)

( * ) Notice: Subject to any disclaimer, the term of this patent is extended or adjusted under 35 U.S.C. 154(b) by 178 days.

(21) Appl. No.: 15/754,450

(22) PCT Filed: Aug. 30, 2016

(86) PCT No.: PCT/JP2016/075291
§ 371 (c)(1),
(2) Date: Feb. 22, 2018

(87) PCT Pub. No.: WO2017/047374
PCT Pub. Date: Mar. 23, 2017

(65) Prior Publication Data
US 2018/0246054 A1   Aug. 30, 2018

(30) Foreign Application Priority Data

Sep. 14, 2015 (JP) .................................. 2015-181186

(51) Int. Cl.
*G01N 27/333* (2006.01)
(52) U.S. Cl.
CPC ....... *G01N 27/333* (2013.01); *G01N 27/3335* (2013.01)
(58) Field of Classification Search
CPC .......................... G01N 27/333; G01N 27/3335
See application file for complete search history.

(56) References Cited

U.S. PATENT DOCUMENTS 4,683,048 A   7/1987 Yamada et al.
4,859,306 A   8/1989 Siddiqi et al.
(Continued)

FOREIGN PATENT DOCUMENTS

EP    0 231 476 A1    8/1987
EP    0490631 A2 *  12/1991    ............. G01N 27/30
(Continued)

OTHER PUBLICATIONS

Lundgren et al., "Observations on the Composition of Prussian Blue Films and Their Electrochemistry," Inorg. Chem. 1988, 27, 933-939 (Year: 1988).*

(Continued)

*Primary Examiner* — Alexander S Noguerola
(74) *Attorney, Agent, or Firm* — Crowell & Moring LLP

(57) ABSTRACT

There is provided a solid-contact ion-selective electrode having a high potential stability and potential reproducibility. The ion-selective electrode includes an ion sensitive film having a Group-1 element ion, a Group-2 element ion, a hydronium ion or an ammonium ion as a target ion, an ion occluding material layer, and a conductive electrode, wherein the ion occluding material contained in the ion occludes material layer occluding the target ion, the ion occluding material being a Prussian blue analog represented by the structure formula $A_aM_x[M'(CN)_6]_y\square_z \cdot kH_2O$. Herein, A is one type or a plurality of types of Group-1 elements, Group-2 elements, hydronium, or ammonium; M and M' are one type or a plurality of types of transition metals; M or M' includes at least one of nickel, cobalt, copper, silver, and cadmium; $\square$ is a vacancy in a porous coordination polymer; x and y are greater than zero; and a, z, and k are numbers equal to or greater than zero.

12 Claims, 17 Drawing Sheets

(56) References Cited

U.S. PATENT DOCUMENTS

| | | | |
|---|---|---|---|
| 4,871,442 | A | 10/1989 | Yamaguchi et al. |
| 5,286,365 | A | 2/1994 | Shu |
| 2004/0163949 | A1 | 8/2004 | Sorensen et al. |
| 2014/0132274 | A1 | 5/2014 | Freeman et al. |

FOREIGN PATENT DOCUMENTS

| | | |
|---|---|---|
| EP | 2 479 560 A1 | 7/2012 |
| EP | 3 054 290 A1 | 8/2016 |
| JP | 60-243555 A | 12/1985 |
| JP | 63-100369 A | 5/1988 |
| JP | 6-33063 U | 4/1994 |
| WO | WO 2015/045606 A1 | 4/2015 |

OTHER PUBLICATIONS

Arkady Karyakin, "Review—Prussian Blue and Its Analogues: Electrochemistry and Analytical Applications,", Electroanalysis 2001, 13, No. 10, pp. 813-819 (Year: 2001).*

International Search Report (PCT/ISA/210) issued in PCT Application No. PCT/JP2016/075291 dated Nov. 22, 2016 with English translation (Four (4) pages).

Japanese-language Written Opinion (PCT/ISA/237) issued in PCT Application No. PCT/JP2016/075291 dated Nov. 22, 2016 (Four (4) pages).

Extended European Search Report issued in counterpart European Application No. 16846245.5 dated Jul. 11, 2019 (14 pages).

Gabrielli et al., "An Electrogravimetric Study of an All-Solid-State Potassium Selective Electrode with Prussian Blue as the Electroactive Solid Internal Contact", Journal of the Electrochemical Society, Jan. 1, 2005, pp. H219-H224, vol. 152, No. 12, XP055571352, six pages.

Giorgetti et al., "Nickel hexacyanoferrate membrane as a coated wire cation-selective electrode", The Analyst, Nov. 15, 2001, pp. 2168-2171, vol. 126, No. 12, XP055571465, four pages.

Thomsen et al., "Evaluation of Electrodes Coated with Metal Hexacyanoferrate as Amperometric Sensors for Nonelectroactive Cations in Flow Systems", Electroanalysis, May 1, 1990, pp. 263-271, vol. 2, XP055425095, nine pages.

Gao et al., "Potassium ion-selective electrode based on a cobalt (II)-hexacyanoferrate film-modified electrode", Analytica Chimica Acta, Jan. 1, 1991, pp. 39-48, vol. 244, Elsevier Science Publishers B.V., Amsterdam, NL, XP026724623, 10 pages.

Kulesza et al., "Electrochemical preparation and characterization of electrodes modified with mixed hexacyanoferrates of nickel and palladium", Journal of Electroanalytical Chemistry, Jun. 1, 2000, pp. 57-65, vol. 487, No. 1, Elsevier, Amsterdam, NL, XP055602221, nine pages.

Kulesza, "Switching between Solid-State Electroactivity, Coupled with Ionic Conductivity, and Semiconducting or Dielectric Properties in Dry Mixed-Metal Hexacyanoferrate Powders", Inorganic Chemistry, Jan. 1, 1990, pp. 2395-2397, vol. 29, No. 19, XP055571806, three pages.

Chinese-language Office Action issued in counterpart Chinese Application No. 201680049256.9 dated Jan. 17, 2020 with partial English translation (15 pages).

* cited by examiner

SOLID LINE:K-NiHCF
BROKEN LINE:Na-NiHCF
DASH DOT LINE:Ca-NiHCF

SOLID LINE:K-NiHCF
BROKEN LINE:K-CuHCF
DASH DOT LINE:K-FeHCF

FIG. 14A
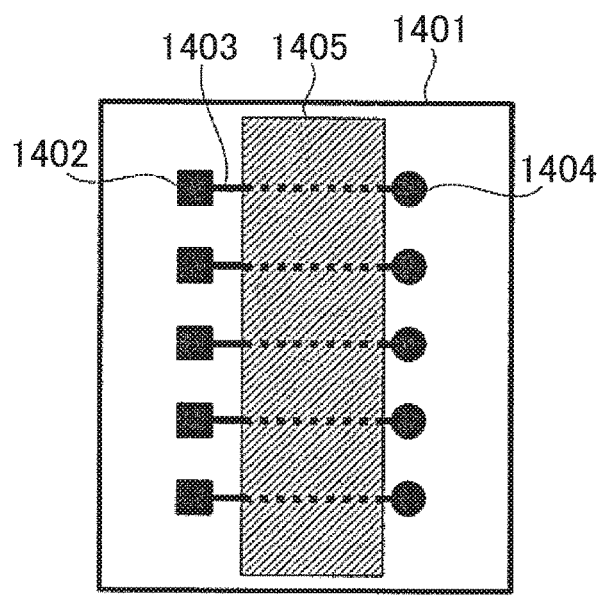
FIG. 14B
FIG. 14C
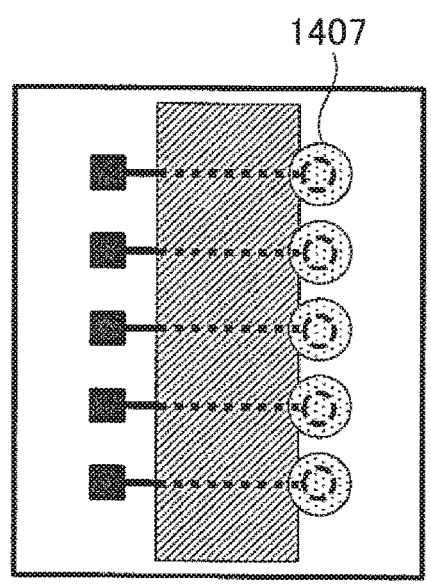
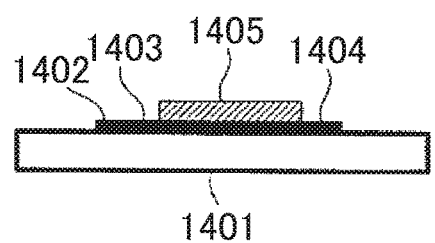
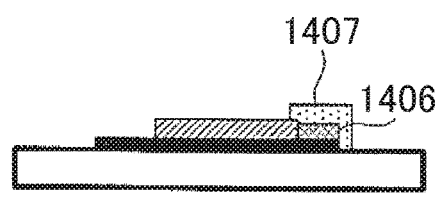
FIG. 14D

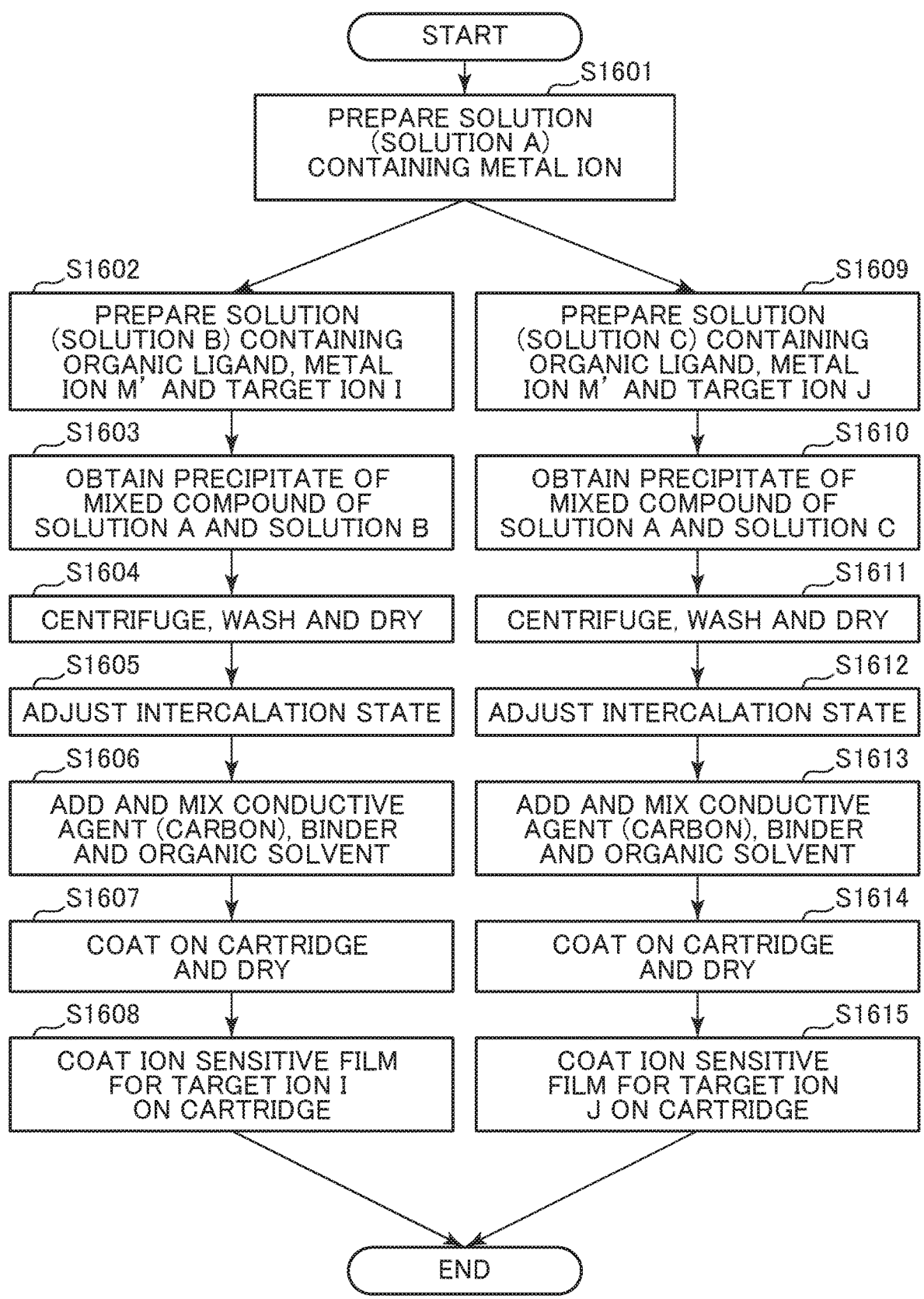

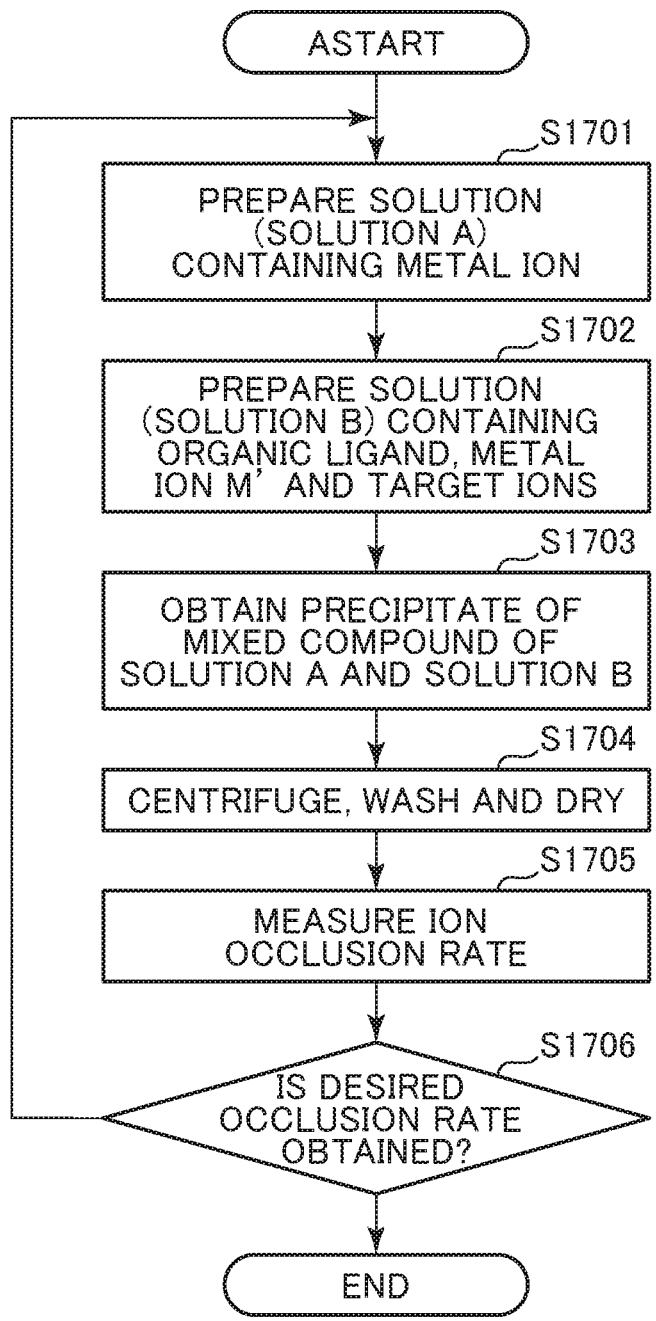

us 10,871,464 B2

ION-SELECTIVE ELECTRODE, METHOD OF MANUFACTURE THEREOF, AND CARTRIDGE

TECHNICAL FIELD

The present invention relates to a solid-contact ion-selective electrode, a method of manufacture thereof and a cartridge.

BACKGROUND ART

Ion-selective electrodes have been used in a wide range of fields such as biology, medical, and environmental, as it is easy to generate an electromotive force in accordance with the concentration of a target ion to be measured by merely contacting a reference electrode with a sample solution. For example, ion concentrations in the blood are important from a biomedical point of view, thus, the measurement of sodium, potassium, and chlorine in the blood is performed millions of times each year. These measurements have been performed not only by large inspection apparatuses in hospitals and examination centers but also by small apparatuses in clinics and medical sites.

Many medical ion-selective electrodes use a polymer type ion sensitive film including an ionophore which selectively binds to a target ion to be measured. An interface potential in accordance with the Nernst equation is generated between the ion sensitive film and an aqueous solution in contact therewith. By bringing one side of the ion sensitive film into contact with a liquid (internal liquid) containing a fixed concentration of the target ion to be measured, and bringing the other side into contact with a sample solution of an unknown concentration, a potential is generated between both solutions in accordance with the concentration ratio. An internal liquid type ion-selective electrode (IF-ISE; Inner-filling type Ion-selective electrode) uses this principle. The internal liquid type ion-selective electrode has a stable potential due to the internal liquid, the difference between the potentials of the electrodes is small, and a potential close to theoretical value can be obtained. The internal liquid type ion-selective electrode has a high reliability, and has been widely used in large inspection apparatuses in hospitals and inspection centers.

On the one hand, a solid-contact ion-selective electrode (SC-ISE) for contacting the surface of the internal liquid side of a sensitive film with the solid internal electrode is often used in order to eliminate the internal liquid which occupies most of the volume in a small apparatus. A conductive polymer, carbon, an ion occluding material and the like have been used as the internal electrode. US 2004/0163949A1 and U.S. Pat. No. 4,859,306 may be mentioned as examples which uses the ion occluding material.

CITATION LIST

Patent Literature

Patent Document 1: US 2004/0163949 A1
Patent Document 2: U.S. Pat. No. 4,859,306

SUMMARY OF INVENTION

Technical Problem

As the result of research and as the problems of solid-contact ion-selective electrodes, it was found that the reproducibility of the potential was low, the stability of the potential was low, and the potential to be obtained could not be predicted. It is necessary to solve these problems so that a solid-contact ion-selective electrode has properties comparable to the internal liquid type ion-selective electrode. Specifically, in a solid-contact ion-selective electrode which uses the ion occluding material, it is understood that the ion occluded in the ion occluding material and the amount thereof are important in the solution to these problems.

Solution to Problem

The ion-selective electrode of the present invention uses an ion occluding material which occluded the target ion to be measured as a base electrode. Namely, the ion-selective electrode of the present invention is an electrode which selectively detects the target ion to be measured in the sample solution, and the electrode is comprised of a conductive wire, a conductive electrode, an ion occluding material layer, and an ion sensitive film.

As an example, the target ion to be measured is a Group-1 element ion, a Group-2 element ion, a Group-17 element ion, a hydronium ion, or an ammonium ion.

As an example, the ion occluding material layer is a porous coordination polymer.

As an example, the step of manufacturing the porous coordination polymer includes a step of mixing Solution A containing a transition metal M with Solution B containing a transition metal M', and a step of recovering the porous coordination polymer from a product by the mixture, wherein the transition metal M and the transition metal M' are the same or different, at least Solution A contains a transition metal M having a different valence, and at least one of Solution A and Solution B contains an organic ligand.

As an example, the step of manufacturing the ion occluding material layer includes a step of dispersing an ion occluding material in a solution, a step of adding an oxidation-reduction substance to the solution in which the ion occluding material is dispersed, and a step of recovering the ion occluding material in which an ion occlusion rate is adjusted due to the addition of the oxidation-reduction substance.

As an example, the step of manufacturing the ion occluding material layer includes a step of preparing a first ion occluding material in which an ion occlusion rate of the target ion is a first value, a step of preparing a second ion occluding material in which the ion occlusion rate of the target ion is a second value, and a step of mixing the first ion occluding material with the second ion occluding material.

Advantageous Effects of Invention

According to the present invention, by the ion occluding material in which the target ion to be measured is occluded being used as a base electrode, the target ion to be measured in the interface between the base electrode and the ion sensitive film becomes the electrochemical control factor, and a high potential stability can be obtained. By adjusting the ion occlusion rate in the ion occluding material prior to forming the base electrode, high potential reproducibility can be obtained, and, a potential which can be predicted from the ion occluding material and the ion occlusion rate can be obtained. By using a Prussian blue analog containing nickel, cobalt, copper, silver, and cadmium which are transition metals other than iron in the ion occluding layer, the adjustment of the ion occlusion rate becomes easy.

Problems, configurations, and advantageous effects other than the foregoing will become apparent from the following description of embodiments.

BRIEF DESCRIPTION OF DRAWINGS

FIGS. 14A to 14D are diagrams illustrating an example of a cartridge which uses the solid-contact ion-selective electrode.

FIG. 16 is a diagram illustrating an example of the steps for manufacturing the cartridge.

FIG. 17 is a diagram illustrating an example of the method for adjusting the ion occlusion rate of the porous coordination polymer.

DESCRIPTION OF EMBODIMENTS

Embodiments of the present invention will be hereinafter described with reference to the drawings.

Figure 1:
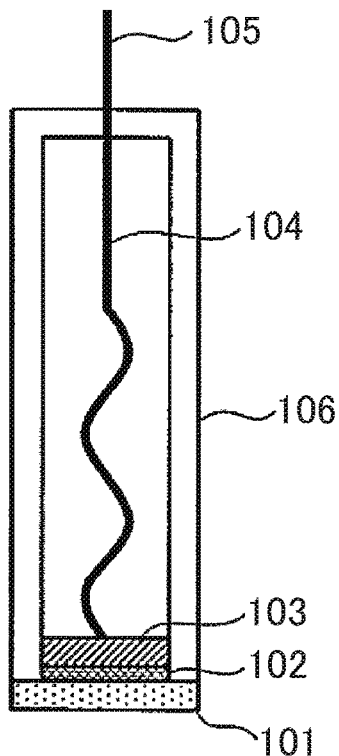
FIG. 1 is a schematic diagram illustrating a structural example of an ion-selective electrode.

FIG. 1 is a schematic diagram illustrating a structural example of the ion-selective electrode of the present invention. The ion-selective electrode includes an ion sensitive film 101, an ion occluding material layer 102, a conductive electrode 103, a conductive wire 104, a terminal 105, and a cartridge 106. The ion sensitive film 101 includes a vinyl chloride resin, a plasticizer, a ligand, and a hydrophobic anion, and is adhered to the cartridge 106. The ion occluding material layer 102 includes an ion occluding material, conductive particles, and a bonding agent, and is disposed within the cartridge 106 in close contact with the ion sensitive film 101. The conductive electrode 103 is in close contact with the ion occluding material layer 102 within the cartridge 106, and plays a role in supporting the ion occluding material layer 102. The conductive wire 104 is in contact with the conductive electrode 103. The terminal 105 is bonded to the conductive wire 104, and plays a role in extracting the potential of the ion occluding material layer 102 through the conductive wire 104 and the conductive electrode 103.

The target ion to be measured of the ion-selective electrode of the present invention is a Group-1 element ion, a Group-2 element ion, a Group-17 element ion, a hydronium ion or an ammonium ion and the like. The ion occluding material layer 102 is constituted by a porous coordination polymer such as the Prussian blue analog described below, and occludes the ion which is the target for measurement. The ion sensitive film 101 contains an ionophore such as a crown ether when a cation such as a Group-1 element ion, a Group-2 element ion, a hydronium ion, or an ammonium ion is used as the target ion to be measured, and contains the ligand of a cation such as a quaternary ammonium salt when a Group-17 element ion is used as the target ion to be measured.

Figure 2:
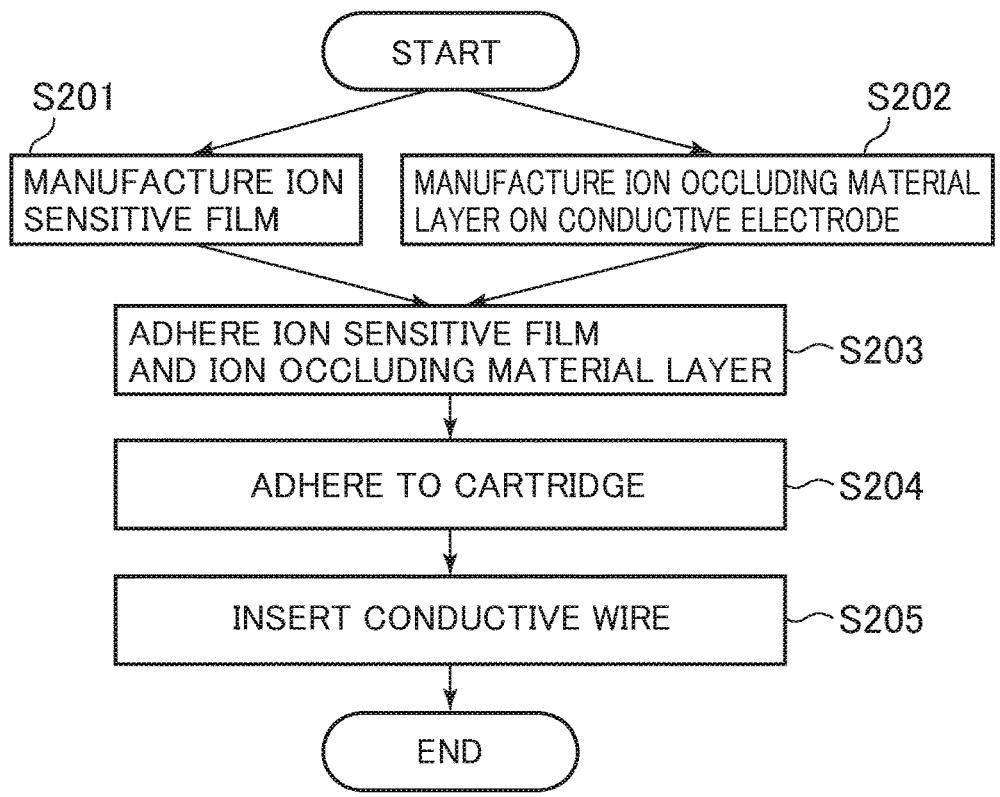
FIG. 2 is a flowchart illustrating an example of the steps for manufacturing the ion-selective electrode.

FIG. 2 is a flowchart illustrating an example of the steps for manufacturing of the ion-selective electrode. After performing the step (S201) for manufacturing the ion sensitive film 101 and the step (S202) for manufacturing the ion occluding material layer 102 on the conductive electrode 103, the ion sensitive film 101 is adhered with the ion occluding material layer 102 (S203). Then, the ion sensitive film 101 adhered with the ion occluding material layer 102 is adhered to the cartridge 106 (S204), and the conductive wire 104 is inserted (S205).

As an example, the example of the steps for manufacturing the lithium ion-selective electrode will be explained. The manufacturing step (S201) of the ion sensitive film is as follows. 3.0 mg of lithium ionophore (6,6-dibenzyl-14-crown-4), 2.0 mg of hydrophobic anion potassium tetrakis (4-chlorophenyl) borate, 100 mg of polyvinyl chloride, and 200 mg of a plasticizer 2-nitrophenyl octyl ether are dissolved in 3 ml of tetrahydrofuran. The solution is placed in a 33-mm diameter Petri dish, and the tetrahydrofuran is evaporated overnight. A sensitive film having a 6-mm diameter is cut from the obtained film. The film is immersed overnight in an aqueous solution of 10 mmol/l lithium chloride to exchange the cations within the sensitive film. Then, the film us washed in pure water and dried. The above is the manufacturing step (S201) of the ion sensitive film.

The example of the step (S202) for manufacturing the ion occluding material layer on the conductive electrode will be explained in more detail using FIG. 3. Lithium iron phosphate which is a lithium ion occluding material is dispersed in acetonitrile (S301). In accordance with need, a reducing agent and lithium ions are added to the solution, and the lithium occlusion rate of the lithium iron phosphate is adjusted to about 100% (S302). At this time, since the initial lithium occlusion rate was almost 100%, this step (S302), the subsequent separation, washing, drying, and the step (S303) for re-dispersing in acetonitrile were omitted. Nitronium tetrafluoroborate was added to the solution as an oxidizing agent to make the lithium occlusion rate to almost 50% (S304). The lithium occlusion rate of the lithium iron phosphate is adjusted to 50% thereby. In the chemical formula, the 50% lithium iron phosphate corresponds to $Li_{0.5}FePO_4$. Then, the product was separated, washed, and dried (S305), and a lithium iron phosphate powder having a lithium occlusion rate of 50% was obtained. This powder (weight ratio 85%), graphite (weight ratio 10%) as a conductive agent, and polyvinylidene fluoride (weight ratio 5%) as a bonding agent were dissolved in N-methyl pyrrolidone (S306), coated on a graphite sheet which is the conductive electrode to a thickness of about 100 μm, and dried overnight in a 60° C. oven (S307). After compressing at a pressure of $1\times10^5$ $N/m^2$, the layer was cut to a 3-mm diameter. The above is the step (S202) for manufacturing the ion occluding material layer on the conductive electrode.

A small amount of tetrahydrofuran was dripped on an ion sensitive film having a 6-mm diameter, and the conductive electrode coated with an ion occluding material layer having a 3-mm diameter was adhered so that the ion occluding material layer was in contact with the ion sensitive film (S203). The electrode manufactured in step S203 was adhered on one end of a polyvinyl chloride pipe having an outer diameter of 6 mm and an inner diameter of 4 mm as a cartridge to form the configuration in FIG. 1 (S204). The configuration having a carbon fiber attached to the tip of a copper wire was inserted into the configuration manufactured in step S204 as a conductive wire (S205) so the electrical connection as in the configuration in FIG. 1 could be obtained. The above is an example of step of manufacturing the lithium ion-selective electrode.

An example of steps for manufacturing a potassium ion-selective electrode will be described as a separate example. The manufacturing step (S201) of the ion sensitive film is as follows. 4.0 mg of potassium ionophore (Valinomycin), 1.0 mg of hydrophobic anion potassium tetrakis (4-chlorophenyl) borate, 133 mg of polyvinyl chloride, and 267 mg of a plasticizer dioctyl sebacate are dissolved in 4 ml of tetrahydrofuran. The solution is placed in a 33-mm diameter Petri dish, and the tetrahydrofuran is evaporated overnight. A sensitive film having a 6-mm diameter is cut from the obtained film. The above is the manufacturing step (S201) of the ion sensitive film.

Another example of the step (S202) for manufacturing the ion occluding material layer on the conductive electrode will be explained in more detail using FIG. 4. The nickel-potassium hexacyanoferrate which is a potassium ion occluding material was dispersed in pure water (S401). To prepare the nickel-potassium hexacyanoferrate in which the potassium ion occlusion rate is low, a sufficient amount of hydrogen peroxide and the like is added to the solution as an oxidizing agent (S402), and the solution is centrifuged, washed and dried (S403). To prepare a nickel-potassium hexacyanoferrate in which the potassium ion occlusion rate is high, a sufficient amount of ascorbic acid and the like as a reducing agent and the potassium ions to be occluded are added to the solution (S404), and the solution is centrifuged, washed and dried (S405). A nickel-potassium hexacyanoferrate having the desired potassium occlusion rate is obtained by mixing these components at a desired ratio (S406). For example, if the potassium occlusion rate is made as x, the nickel-potassium hexacyanoferrate is represented by $K_{1+x}Ni[Fe(CN)_6]$, and the nickel-potassium hexacyanoferrate having a potassium occlusion rate of about 0% can be obtained in steps S402 and S403, and the nickel-potassium hexacyanoferrate having a potassium occlusion rate of about 100% can be obtained in steps S404 and S405. When these the nickel-potassium hexacyanoferrates are mixed in equivalent amounts, a nickel-potassium hexacyanoferrate having a potassium occlusion rate of about 50% can be obtained.

Therefore, as the reason that an average value of the ion occlusion rate can be obtained by mixing these powders, it is considered that an exchange of ions is actually performed between the ion occluding materials, or, the value functions as an averaged value since the time from the production of the ion-selective electrode until use is several days to several months which is sufficiently long compared to the time scale (approximately seconds to hours) of ion diffusion within the ion occluding material and between the ion occluding materials.

The obtained nickel-potassium hexacyanoferrate (weight ratio 85%), graphite (weight ratio 10%) as a conductive agent, and polyvinylidene fluoride (weight ratio 5%) as a bonding agent were dissolved in N-methyl pyrrolidone (S407), coated on a graphite sheet which is the conductive electrode to a thickness of about 100 μm, and dried overnight in a 60° C. oven (S408). After compressing at a pressure of $1\times10^5$ $N/m^2$, the layer was cut to a 3-mm diameter. The above is the step (S202) for manufacturing the ion occluding material layer on the conductive electrode.

A small amount of tetrahydrofuran was dripped on the ion sensitive film having a 6-mm diameter, and the conductive electrode coated with the ion occluding material layer having a 3-mm diameter was adhered so that the ion occluding material layer was in contact with the ion sensitive film (S203). The electrode manufactured in step S203 was adhered on one end of a polyvinyl chloride pipe having an outer diameter of 6 mm and an inner diameter of 4 mm as a cartridge to form the configuration in FIG. 1 (S204). The configuration having a carbon fiber attached to the tip of a copper wire was inserted into the configuration manufactured in step S204 as a conductive wire (S205) so that the electrical connection as in the configuration in FIG. 1 could be obtained. The above is an example of steps for manufacturing the potassium ion-selective electrode.

Figure 3:
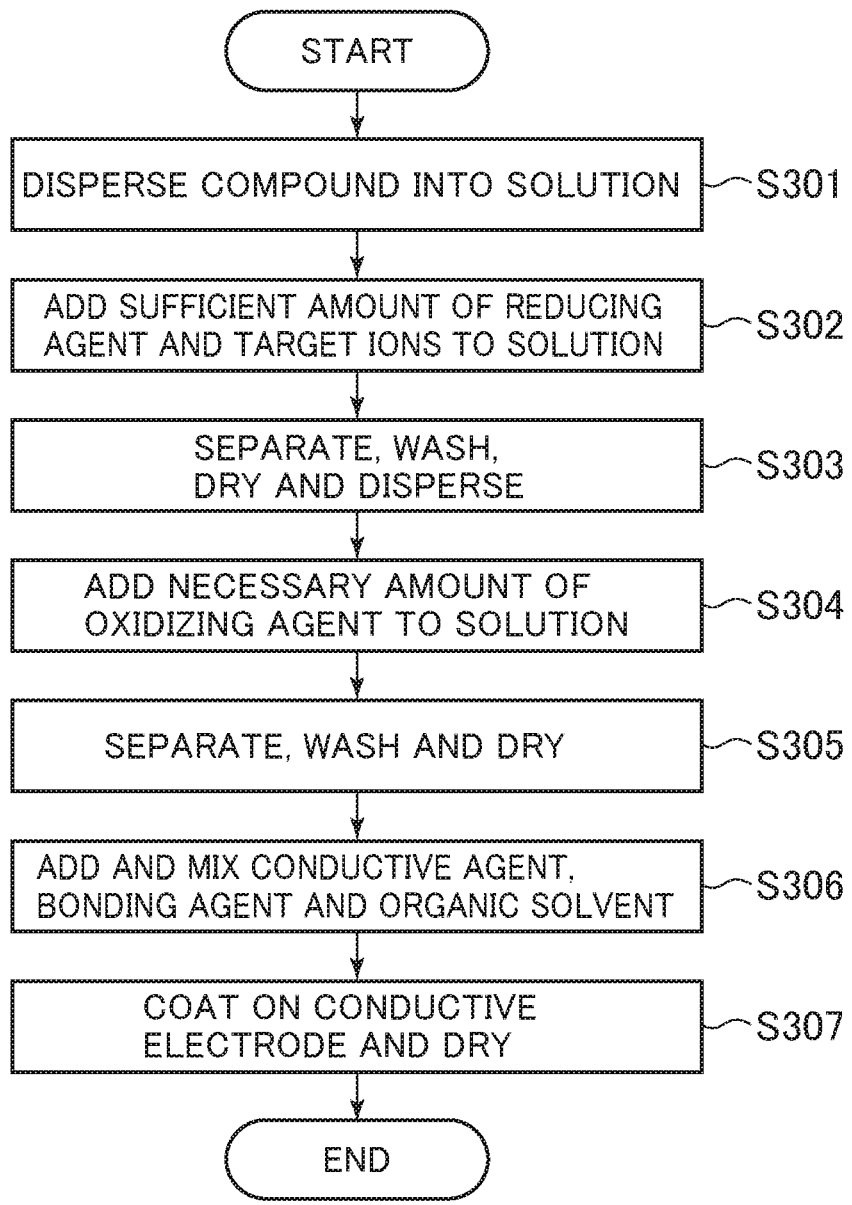
FIG. 3 is a diagram illustrating an example of the steps for manufacturing an ion occluding material layer on a conductive electrode.
Figure 4:
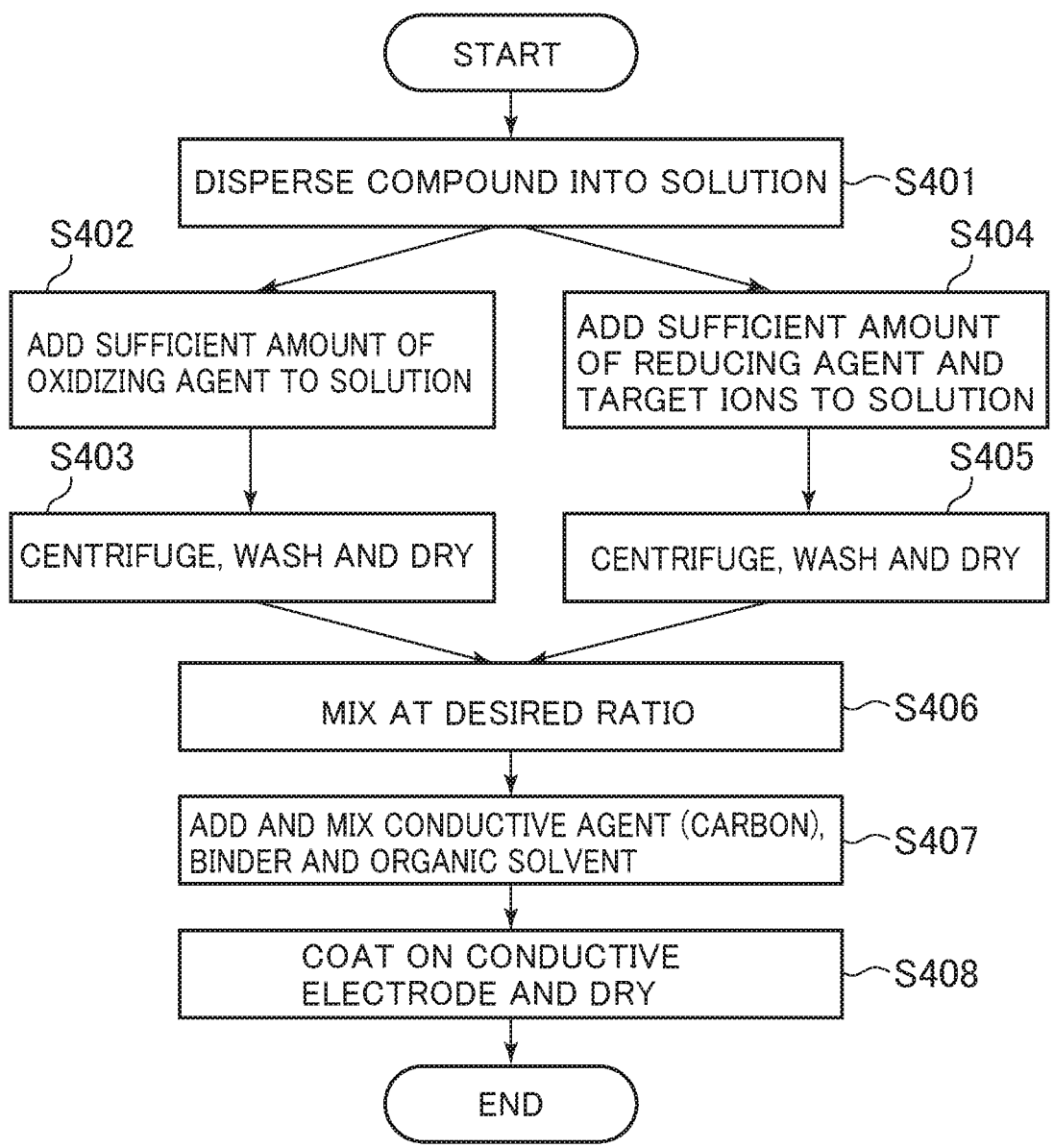
FIG. 4 is a diagram illustrating an example of the steps for manufacturing the ion occluding material layer on the conductive electrode.
Figure 5:
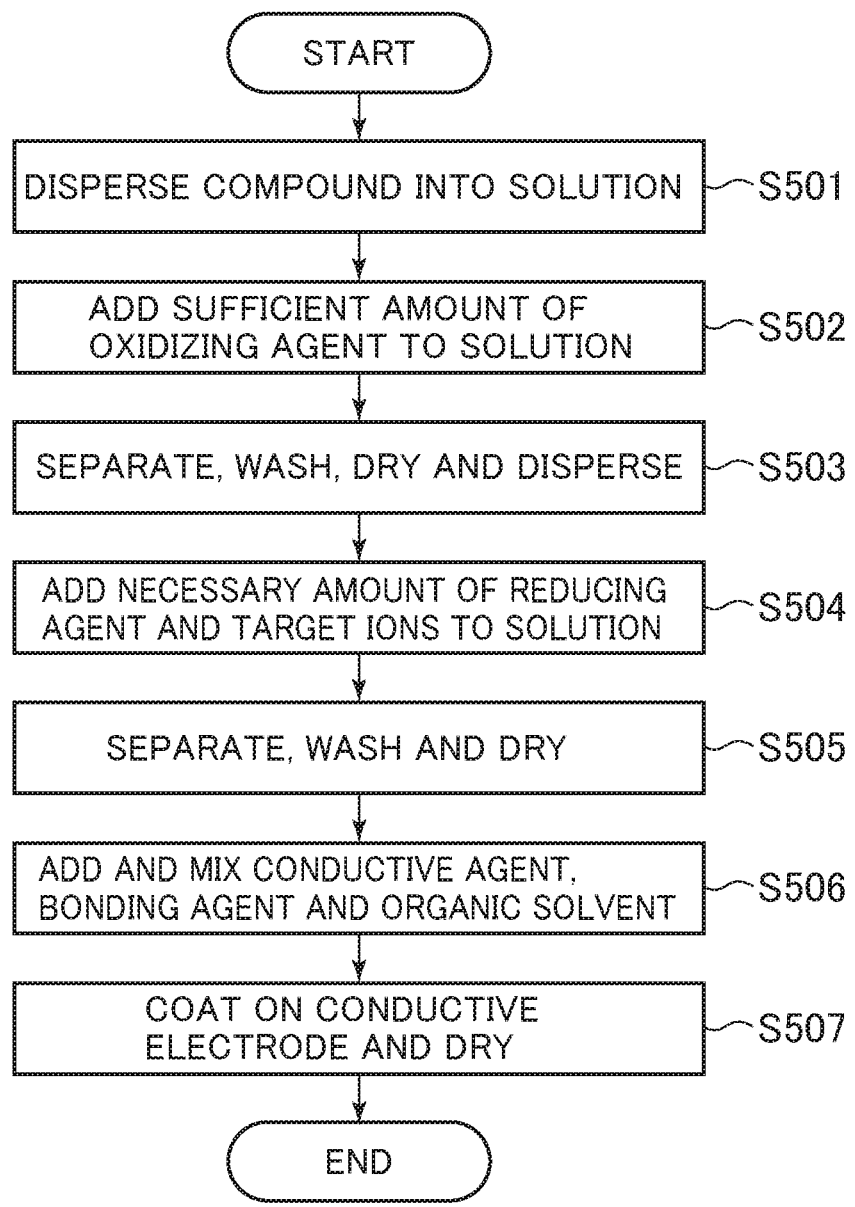
FIG. 5 is a diagram illustrating an example of the steps for manufacturing the ion occluding material layer on the conductive electrode.

The step of adjusting the ion occlusion rate of the ion occluding material may be a method for adjusting with an amount of the reducing agent as in FIG. 5, in addition to FIGS. 3 and 4. The steps S501, S503, S505, S506, S507 of FIG. 5 respectively correspond to the steps S301, S303, S305, S306, S307 of FIG. 3. Further, step S502 is the step of adding a sufficient amount of an oxidizing agent to the solution and adjusting the target ion occlusion rate of the ion occluding material to about 0%. Step S504 is the step of adding a necessary amount of the reducing agent and target ion to the solution and adjusting the target ion occlusion rate of the ion occluding material to the desired value.

Further, in the case where the original ion occlusion rate of the ion occluding material is known, the step (S302) for increasing the ion occlusion rate with a reducing agent can be omitted, either the step (S402) for decreasing the ion occlusion rate with an oxidizing agent or the step (S404) for increasing the ion occlusion rate with a reducing agent can be omitted, and the step (S502) for decreasing the ion occlusion rate with an oxidizing agent can be omitted.

Note that, the ion occlusion rate of the ion occluding material contained in the ion occluding material layer does not necessarily have to be 50%, and typically should be adjusted so that the ion occlusion rate falls within the range of 0.1 to 0.9.

Further, the manufacturing steps of the ion occluding material layer shown in FIGS. 3 to 5 are applicable in the case where the ion which is occluded in the ion occluding material is a Group-1 element ion, a Group-2 element ion, a hydronium ion or an ammonium ion.

Figure 6:
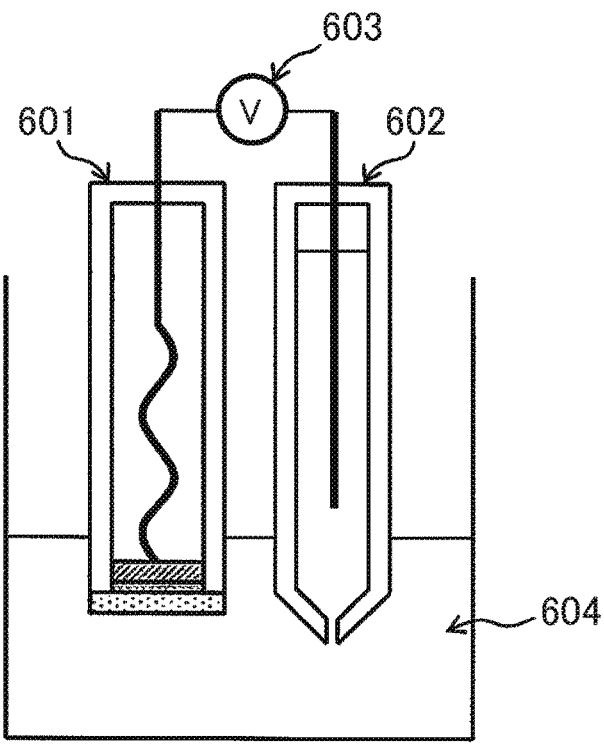
FIG. 6 is a schematic diagram illustrating an example of a measuring device which uses the ion-selective electrode.

FIG. 6 is a schematic diagram illustrating an example of the measuring device which uses the ion-selective electrode of the present invention. An ion-selective electrode 601 of the present invention and a reference electrode 602 were connected to a potentiometer 603, and were immersed in a sample solution 604. Examples of the measurement results which used the measuring device are shown below. Note that, a silver-silver chloride reference electrode which used 1M potassium chloride in the internal liquid was used as the reference electrode 602. Other reference electrodes, for example, a saturated calomel electrode may be used.

Figure 7:
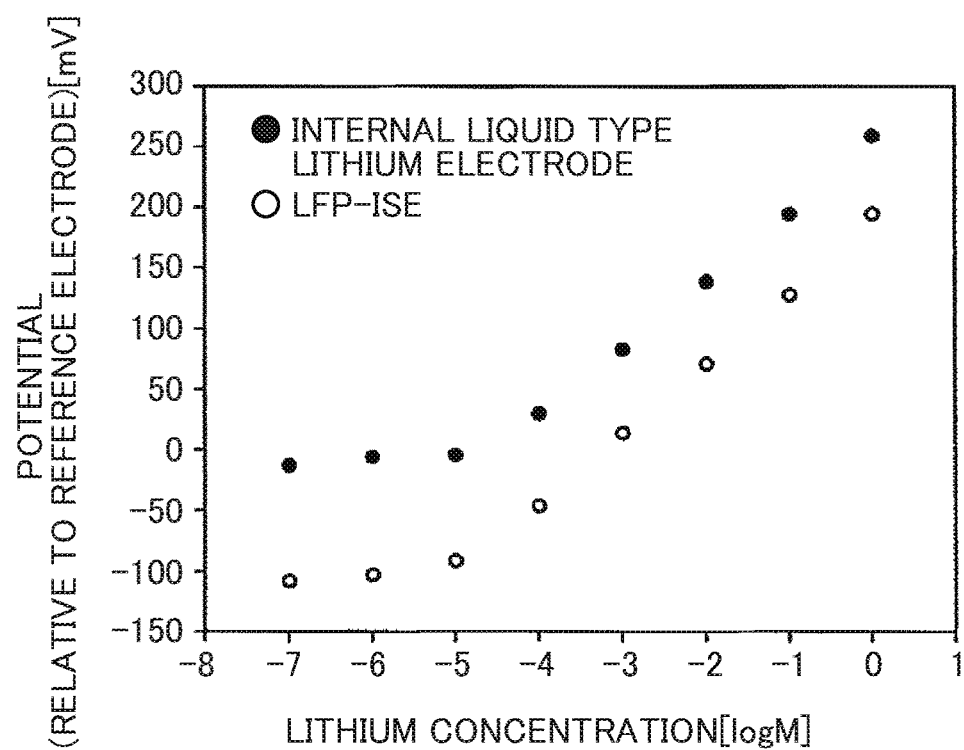
FIG. 7 is a diagram illustrating a measurement example of the lithium ion which uses a lithium ion-selective electrode.

FIG. 7 is a diagram illustrating an example of the measurement results of the lithium ion which uses a lithium ion-selective electrode (LFP-ISE) of the present invention. When lithium chloride was used as the sample solution, a response in accordance with the Nernst equation was obtained at $10^{-5}$ to 1 mmol/l was plotted with ○ in FIG. 7. The lithium ion-selective electrode has the same responsiveness as the internal liquid type ion-selective electrode (internal liquid: 10 mmol/l lithium chloride, internal electrode: silver-silver chloride) manufactured using the same ion sensitive film. Further, the selectivities for sodium and potassium were both $10^{-2.1}$ and $10^{-2.0}$. It is understood from these results that in the lithium ion-selective electrode of the present invention, the potential between the ion sensitive film and the ion occluding material layer is constant and that the potential at the interface of the ion sensitive film and the sample solution responds to the lithium ion concentration within the sample solution.

Figure 8:
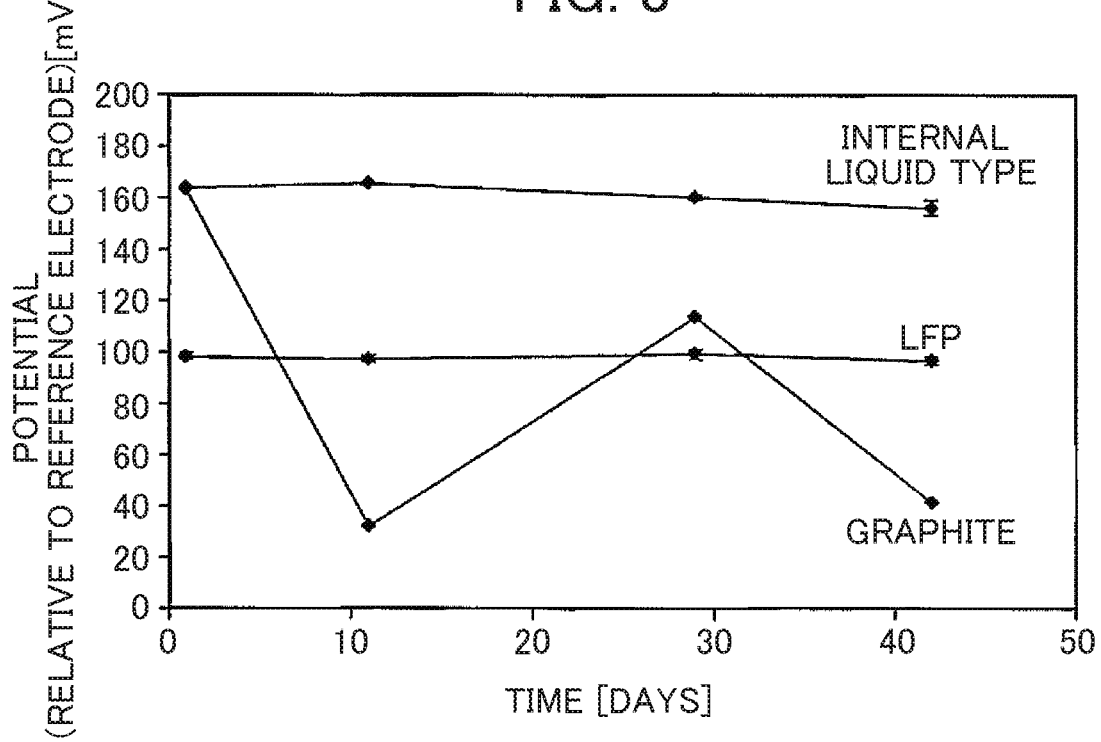
FIG. 8 is a diagram illustrating a measurement example of the long-term potential fluctuations of the lithium ion-selective electrode.

FIG. 8 is a diagram illustrating a measurement example of the long-term potential fluctuations of the lithium ion-selective electrode. FIG. 8 shows the potential in 100 mmol/l lithium chloride using nine solid-contact lithium ion-selective electrodes (in the drawing, referred to as LFP) of the present invention which uses lithium iron phosphate in which the ion occlusion rate was adjusted to 50% in the ion occluding material layer in the step shown in FIG. 3, four conventional internal liquid lithium type ion-selective electrodes (in the drawing, illustrated as the internal liquid type), and for comparison, one solid-contact lithium ion-selective electrode (in the drawing, illustrated as graphite) in which the ion sensitive film was bonded to graphite without an ion occluding material layer. The respective electrodes were immersed in 100 mmol/l lithium chloride aqueous solution and stored at room temperature.

The potential fluctuation over 41 days was −1.7 µV/h for the solid-contact lithium ion-selective electrode and less than −8.1 µV/h for the internal liquid type ion-selective electrode. On the one hand, it is understood that the potential of the solid-contact lithium ion-selective electrode without the ion occluding material layer has large variations. Namely, the potential stability is due to the lithium iron phosphate in which the ion occlusion rate was adjusted to 50% in the step of FIG. 3. Regarding the individual electrode differences, the solid-contact lithium ion-selective electrode had high reproducibility of 98.7±1.4 mV on the first day, and high reproducibility of 93.5 mV±1.3 mV on the 41st day was maintained. This reproducibility is comparable to 164.6±0.5 mV on the first day of the internal liquid type ion-selective electrode. The high potential reproducibility is due to the lithium iron phosphate in which the ion occlusion rate was adjusted to 50% in the step of FIG. 3.

Even though it is considered that the adjustment of the ion occlusion rate can be performed electrochemically after forming the ion occluding material layer, the steps shown in FIG. 3 are superior from the viewpoints of the high reproducibility, convenience and mass production. Further, when electrochemically adjusting the ion occlusion rate, a non-uniformity of the ion occlusion rate easily occurs within the ion occluding material, and it is not easy to adjust to the desired ion occlusion rate. Furthermore, by adjusting the ion occlusion rate in the steps of FIG. 3, it is possible to increase the potential reproducibility in the same lot when manufacturing a plurality of cartridges having the ion-selective electrode and the ion-selective electrode. As a result, inspection prior to shipment becomes easy, and the calibration at the time of use becomes easy or unnecessary. The same result can be obtained in the case where the ion occlusion rate was adjusted by the steps shown in FIG. 4 or FIG. 5 in place of the steps of FIG. 3.

Figure 9A:
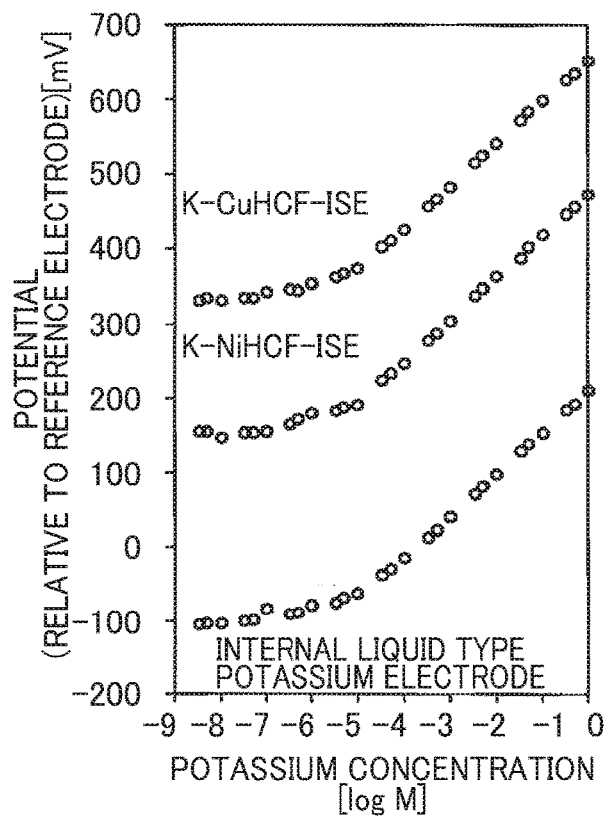
FIGS. 9A to 9C are diagrams illustrating the measurement results of potassium ion, sodium ion, and calcium ion which uses the ion-selective electrode.
Figure 9B:
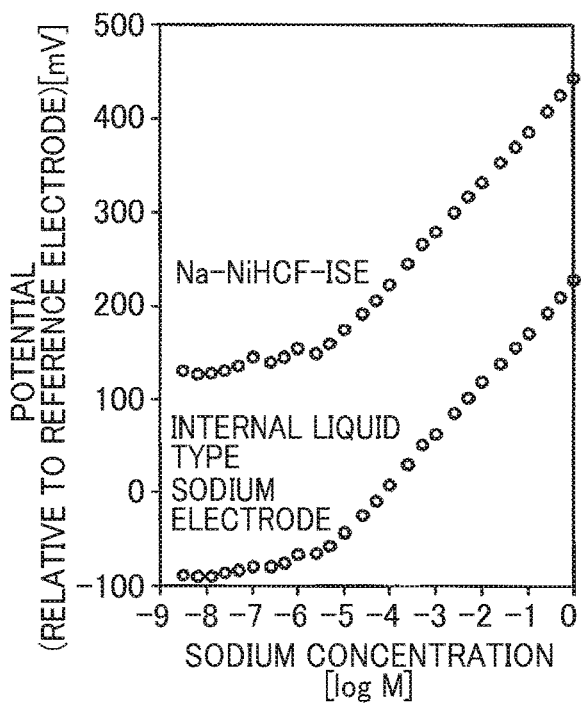
Figure 9C:
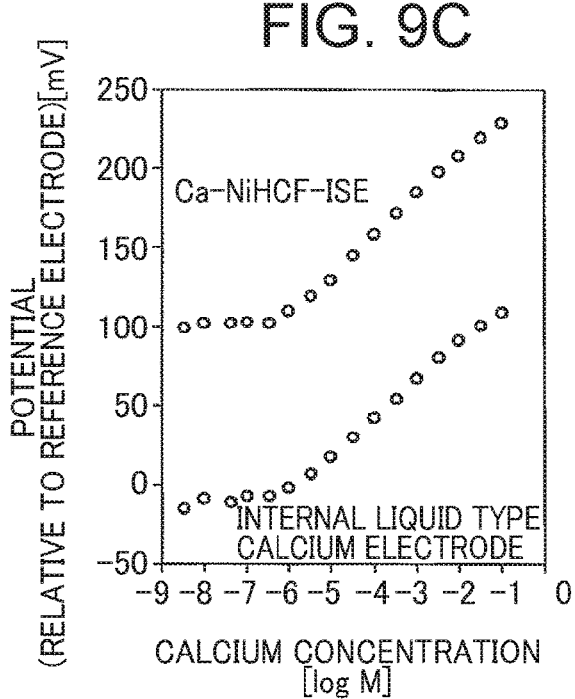

FIGS. 9(a) to (c) are diagrams illustrating the measurement results of potassium ion, sodium ion and calcium ion which respectively used the potassium ion-selective electrode, the sodium ion-selective electrode and the calcium ion-selective electrode of the present invention. A response in accordance with the Nernst equation was obtained at $10^{-5}$ to 1 mol/l in accordance with the concentrations of potassium chloride, sodium chloride and calcium chloride which are the sample solutions. The sensitivity appears to be decreasing at the high concentration region in the measurement of calcium chloride because the activity of calcium is not linear relative to the calcium chloride concentration due to the interaction between the ions. If the activity is calculated using the Debye-Hückel approximation and the like, it is understood that there is a Nernst response even at the high concentration region.

In FIG. 9(a), the nickel-potassium hexacyanoferrate and copper-potassium hexacyanoferrate were used in the ion occluding material layer as the solid-contact ion-selective electrode, and the potassium sensitive film was used in the ion sensitive film. In the drawing, the nickel-potassium hexacyanoferrate and copper-potassium hexacyanoferrate are respectively indicated by K—NiHCF-ISE and K—CuHCF-ISE. As the internal liquid type ion-selective electrode, 10 mmol/l of potassium chloride was used for the internal liquid, silver-silver chloride was used for the internal electrode, and the potassium sensitive film was used for the ion sensitive film. In FIG. 9(b), as the solid-contact ion-selective electrode, nickel-sodium hexacyanoferrate was used in the ion occluding material layer, and the sodium sensitive film was used in the ion sensitive film. In the drawing, the sodium sensitive film is indicated by Na—NiHCF-ISE. As the internal liquid type ion-selective electrode, 10 mmol/l sodium chloride was used in the internal liquid, silver-silver chloride was used in the internal electrode, and the sodium sensitive film was used in the ion sensitive film. In FIG. 9(c), as the solid-contact ion-selective electrode, nickel-calcium hexacyanoferrate was used in the ion occluding material layer, and the calcium sensitive film was used in the ion sensitive film. In the drawing, the calcium sensitive film is indicated by Ca—NiHCF-ISE. As the internal liquid type ion-selective electrode, 10 mmol/l calcium chloride was used in the internal liquid, silver-silver chloride was used in the internal electrode, and the calcium sensitive film was used in the ion sensitive film.

The ion selectivity of each ion-selective electrode is a value in accordance with the selectivity of the ion sensitive film as shown in Table 1, and it is understood that for any solid-contact ion-selective electrode, the potential between the ion sensitive film and the ion occluding material layer is constant, and the potential at the interface of the ion sensitive film and the sample solution responds to the concentration of the target ion to be measured within the sample solution in the same manner as the case of the lithium ion-selective electrode.

TABLE 1

| Electrode | Selectivity (log) | | | | | |
|---|---|---|---|---|---|---|
| | Li$^+$ | Na$^+$ | K$^+$ | NH$_4^-$ | Mg$_2^+$ | Ca$_2^+$ |
| K—CuHCF-ISE | −4.4 | −4.0 | — | −1.9 | −4.7 | −4.5 |
| K—NiHCF-ISE | −4.4 | −4.1 | — | −1.9 | −4.8 | −4.5 |
| Internal liquid type potassium electrode | −4.2 | −3.9 | — | −1.9 | −4.5 | −4.5 |
| Na—NiHCF-ISE | −3.7 | — | −2.7 | −4.6 | −5.4 | −5.7 |
| Internal liquid type sodium electrode | −3.8 | — | −2.7 | −4.6 | −5.4 | −5.7 |
| Ca—NiHCF | −3.9 | −3.6 | −3.8 | −3.9 | −4.0 | — |
| Internal liquid type calcium electrode | −4.0 | −3.8 | −4.0 | −4.1 | −4.2 | — |

Figure 10:
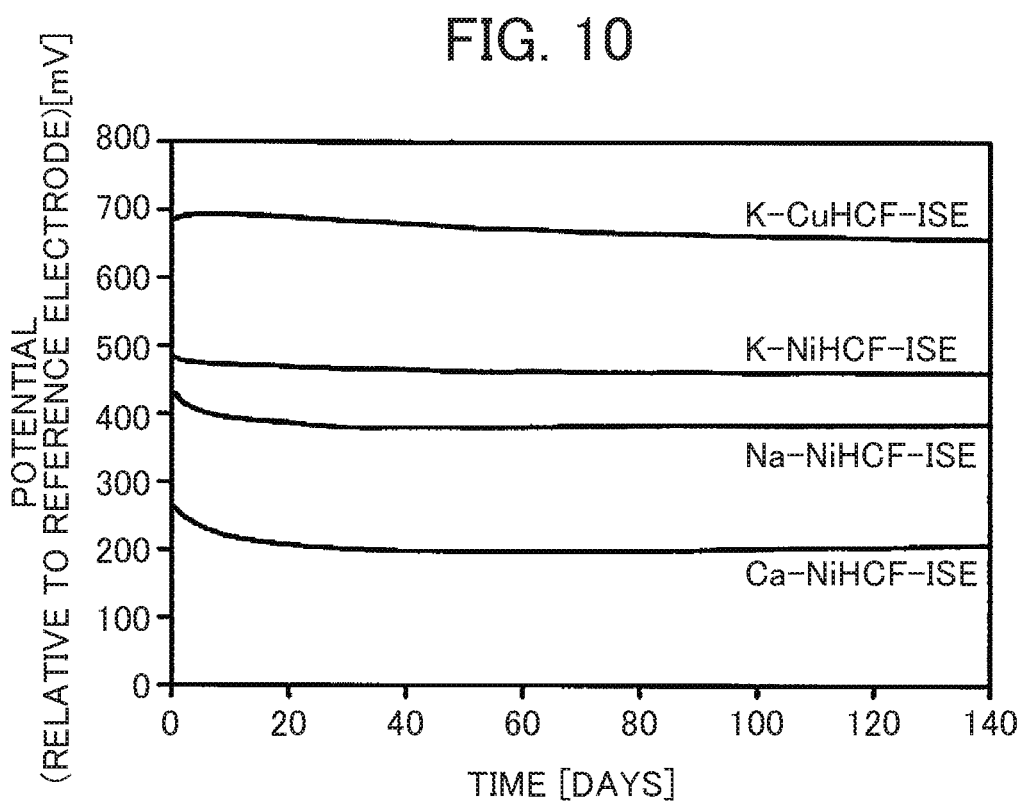
FIG. 10 is a diagram illustrating the potential stability of the ion-selective electrode.

FIG. 10 is a diagram illustrating the potential stability of the sodium ion-selective electrode, the potassium ion-selective electrode and the calcium ion-selective electrode which are the solid-contact ion-selective electrodes of the present invention. It is understood that any of these electrodes show a high potential stability. These high potential stabilities are due to the fact that the ion occluding material layer in which the uniformity of the ion occlusion rate is high can be obtained by a method for controlling the ion occlusion rate of the ion occluding material layer described in FIGS. 3, 4, and 5. Further, the potential variation (standard deviation) one month after being manufactured was as low as 15.1 mV for K—CuHCF-ISE, 0.6 mV for K—NiHCF-ISE, 8.6 mV for Na—NiHCF-ISE, and 8.7 mV for Ca—NiHCF-ISE. Therefore, by adjusting the ion occlusion rate by the steps shown in FIGS. 3, 4, and 5, it is possible to increase the potential reproducibility in the same lot when manufacturing a plurality of cartridges having the ion-selective electrode and the ion-selective electrode. As a result, inspection prior to shipment becomes easy, and the calibration at the time of use becomes easy or unnecessary.

Figure 11A:
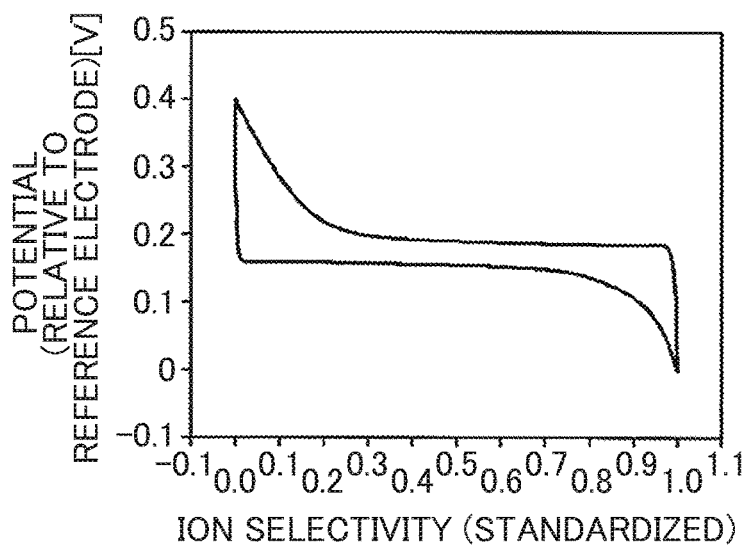
FIGS. 11A to 11C are diagrams illustrating the relationship between the ion occlusion rate and the potential of the ion occluding material layer.
Figure 11B:
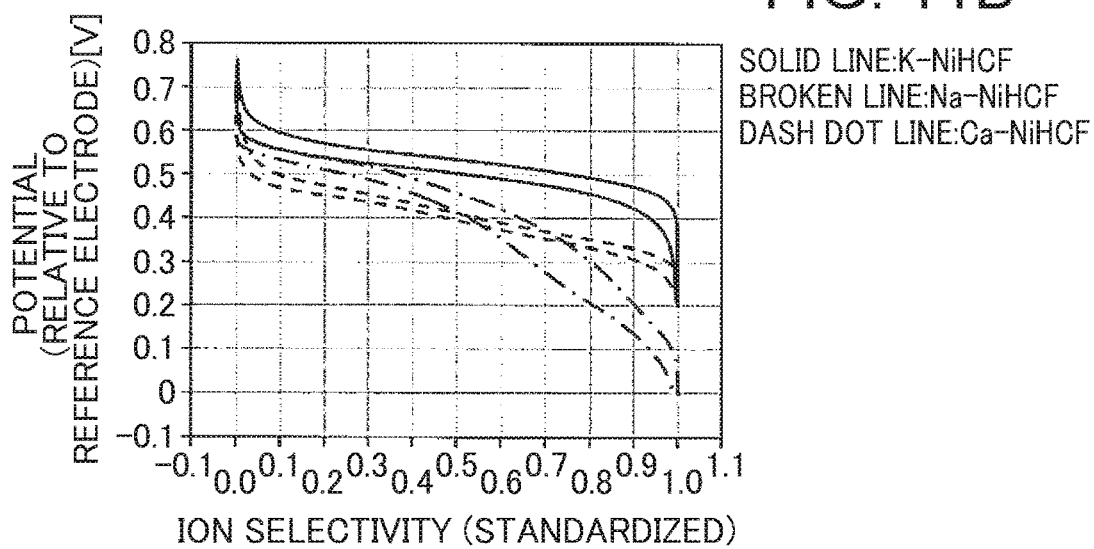
Figure 11C:
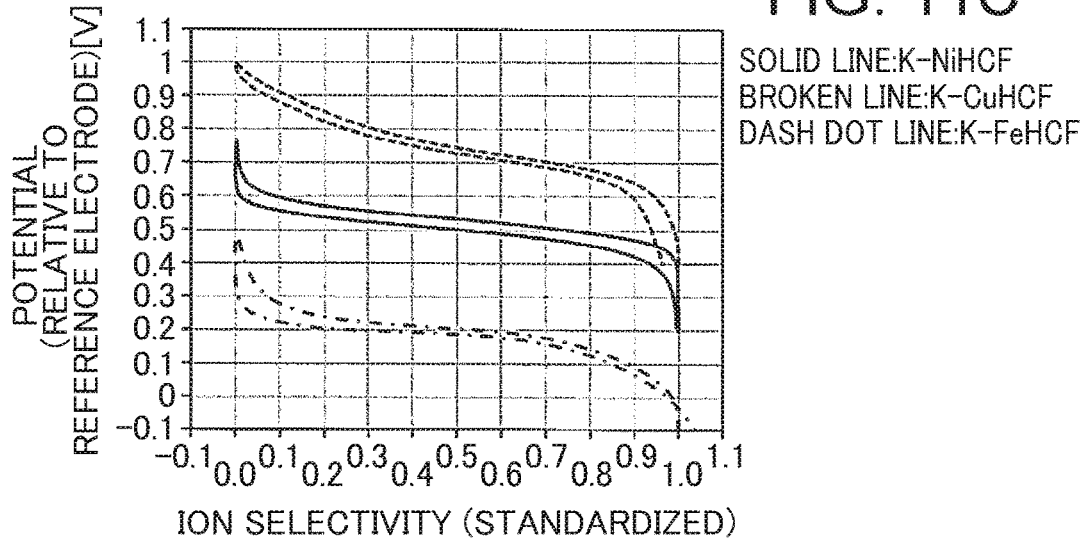

FIGS. 11(a) to (c) are diagrams illustrating the relationship between the ion occlusion rate of the ion occluding material layer and the potential. The ion occlusion rate x is defined by $K_{1+x}Ni[Fe(CN)_6]$ for the nickel-potassium hexacyanoferrate (K—NiHCF), $Na_{1+x}Ni[Fe(CN)_6]$ for nickel-sodium hexacyanoferrate (Na—NiHCF), $Ca_{1/2+x/2}Ni[Fe(CN)_6]$ for nickel-calcium hexacyanoferrate (Ca—NiHCF), $K_{1+x}Cu[Fe(CN)_6]$ for copper-potassium hexacyanoferrate (K—CuHCF), $K_{1+x}Fe[Fe(CN)_6]$ for iron-potassium hexacyanoferrate (K—FeHCF), and $Li_xFePO_4$ for lithium iron phosphate.

The measurement was performed by the 3 electrode method. An electrode on which the ion occluding material to be measured was coated was used as the working electrode. For example, lithium iron phosphate (weight ratio 85%), graphite (weight ratio 10%) as the conductive agent and polyvinylidene fluoride (weight ratio 5%) as the bonding agent were dissolved in N-methyl pyrrolidone, coated on a glassy carbon electrode to a thickness of about 100 μm, and dried overnight in a 60° C. oven. A silver-silver chloride electrode was used for the reference electrode and a platinum electrode was used for the counter electrode.

FIG. 11(a) is a diagram representing the potential response when a constant current was applied to lithium iron phosphate in a 1M lithium chloride aqueous solution. The ion occlusion rate shows an almost constant potential in a wide range of 0.1 to 0.9. This is due to the fact that the interface potential of lithium iron phosphate is determined by a two-phase reaction between $FePO_4$ and $LiFePO_4$.

FIG. 11(b) is a diagram respectively representing the potential response to the application of a constant current of nickel-sodium hexacyanoferrate in an aqueous solution of 0.5 M sodium sulfate, nickel-potassium hexacyanoferrate in an aqueous solution of 0.5 M potassium sulfate, nickel-calcium hexacyanoferrate in an aqueous solution of 1 M calcium nitrate. Further, FIG. 11(c) is a diagram representing the potential response to the application of a constant current of iron-potassium hexacyanoferrate, the nickel-potassium hexacyanoferrate, copper-potassium hexacyanoferrate in an aqueous solution of 0.5 M potassium sulfate. Even if the ion occlusion rate is in a range of 0.1 to 0.9, a change of the potential in the range of 100 to 200 mV can be observed. This is due to the fact that the compounds having these porous coordination polymers show the properties of solid solutions. Therefore, it is necessary to reduce the variation of the ion occlusion rate of the electrodes in order to improve the potential reproducibility by the solid-contact ion-selective electrode which uses the porous coordination polymer. In short, the methods for controlling the ion occlusion rate of the ion occluding material layer described in FIGS. 3 to 5 are particularly effective when using an ion occluding material having, for example, a porous coordination polymer in which the potential is dependent upon the ion occlusion rate.

Further, as is understood from FIG. 11, the closer the ion occlusion rate is to 0.5, the smaller the fluctuations of the potential due to the change of the ion occlusion rate. Therefore, for the ion occluding material layer of the solid-contact ion-selective electrode of the present invention, the ion occlusion rate may be 0.1 to 0.9, desirably 0.2 to 0.8, and more desirably 0.3 to 0.7, and an ion occlusion rate between 0.4 to 0.6 in which the ion occlusion rate substantially becomes 0.5 is the most desirable.

Nickel hexacyanoferrate and copper hexacyanoferrate are specifically suitable as the ion occluding material layer of the ion-selective electrode of the present invention. The iron hexacyanoferrate described in U.S. Pat. No. 4,859,306 has the property that it is easily oxidized, and has been used even as an electrode which utilizes the action of reducing hydrogen peroxide to water to measure hydrogen peroxide. Therefore, the fluctuation of the ion occlusion rate due to oxidation in the step of adjusting the ion occlusion rate and oxidation after forming the ion-selective electrode is a concern. Even though the adjustment of the ion occlusion rate of iron-potassium hexacyanoferrate by the procedures shown in FIGS. 3 to 5 was attempted, the rate could not be adjusted to the desired ion occlusion rate. For the measurements in FIG. 11, iron-potassium hexacyanoferrate in which the initial ion occlusion rate was almost zero was prepared. Even though adjusting the ion occlusion rate to the range of 0.5 by the reduction in the presence of potassium was attempted, the result was that the ion occlusion rate remained at almost zero. Note that, in FIG. 11(c), the potential change due to the current application was measured for a short time (in the range of one hour), thus, the change of the ion occlusion rate can be measured in K—FeHCF. On the one hand, in the method using the aforementioned reducing agent, one day had elapsed from the preparation until the measurement. During this time, it is considered that the ion occlusion rate fluctuated.

It is comparatively difficult to oxidize nickel hexacyanoferrate and copper hexacyanoferrate as the potentials associated with the occlusion and release of the ions are higher than iron hexacyanoferrate. In the ion occlusion rate of FIG.

11, the nickel-potassium hexacyanoferrate having an initial ion occlusion rate in the range of 0.1 could be adjusted to an ion occlusion rate in the range of 0.5 by reduction in the presence of potassium. The adjustment of the ion occlusion rate is possible in the same manner even with copper hexacyanoferrate. However, copper hexacyanoferrate is more likely to be reduced due to the higher potential associated with the occlusion and release of the ion, and the potential of the ion-selective electrode may drift to a low potential, for example, as shown in FIG. 10.

Figure 12:
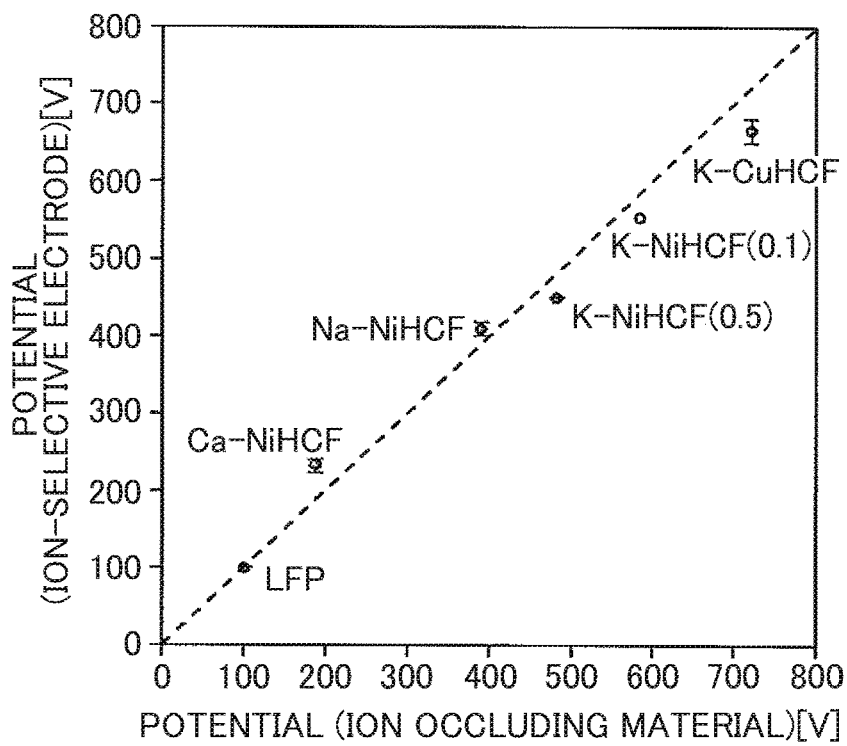
FIG. 12 is a diagram illustrating the correlation between the potential of the ion occluding material layer and the potential of the solid-contact ion-selective electrode.

FIG. 12 is a diagram illustrating that the correlation between the potential of the ion occluding material layer and the potential of the solid-contact ion-selective electrode is high. The abscissa is the potential of the ion occluding material layer without the ion sensitive film, and the ordinate is the potential of the solid-contact ion-selective electrode. The measured value is distributed along a straight line which indicates a correspondence between both potentials, thus, it is understood that the potential of the solid-contact ion-selective electrode reflects the potential of the ion occluding material layer. In short, the potential reproducibility of the ion occluding material layer improves by the method for controlling the ion occlusion rate of the ion occluding material layer described in FIGS. 3 to 5, and as a result, the potential reproducibility of the solid-contact ion-selective electrode improves. Further, it is understood that when the nickel-potassium hexacyanoferrate having a different occlusion rate is used, the potential of the compound in which the occlusion amount is 0.5 (K—NiHCF (0.5)) is lower than the potential of the compound in which the occlusion amount is 0.1 (K—NiHCF (0.1)). Therefore, an association can be observed between the occlusion amount and the potential.

Figure 13:
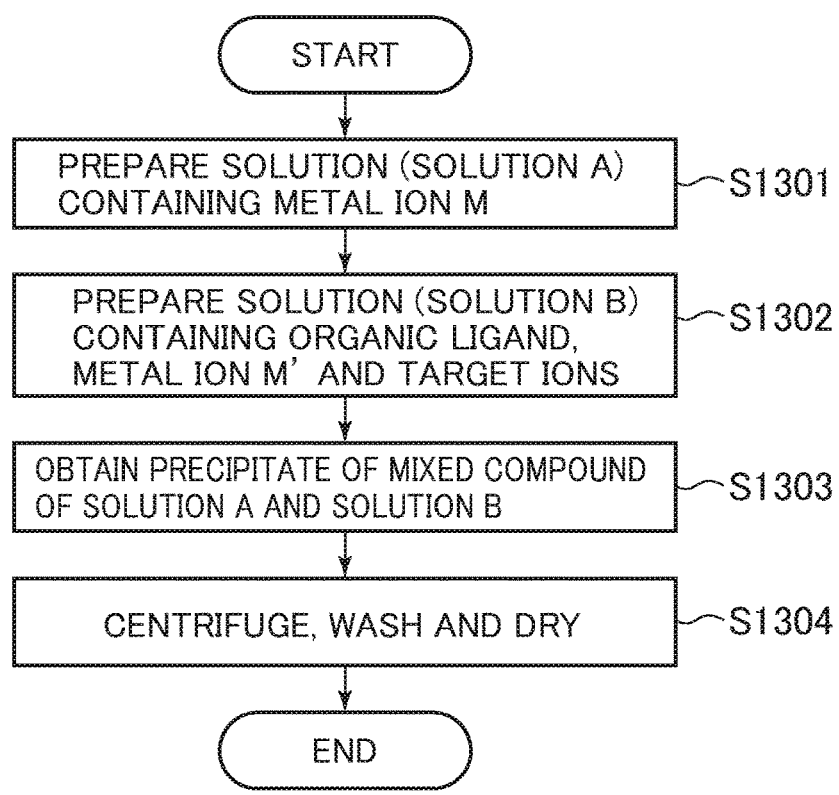
FIG. 13 is a diagram illustrating an example of a method for synthesizing the porous coordination polymer.

FIG. 13 is a diagram illustrating an example of a method for synthesizing the porous coordination polymer. The details will be described for the nickel-potassium hexacyanoferrate as an example. A solution containing nickel ion as the metal ion M, for example, an aqueous solution of nickel nitrate is prepared (S1301). For the sake of convenience, the prepared solution is made as Solution A. Next, a solution including cyan as the organic ligand, iron ions as the metal ion M', and potassium as the target ion, for example, an aqueous solution of potassium ferricyanide is prepared (S1302). For the sake of convenience, the prepared solution is made as Solution B. The order in which S1301 and S1302 are performed is of no consequence. Solution A is mixed with Solution B, and a precipitation of the nickel-potassium hexacyanoferrate which is the target compound is obtained as the product (S1303). At this time, in order to obtain finer and more uniform crystals, it is desirable to perform stirring with a magnetic stirrer, stirring by application of ultrasonic waves, dropwise mixing of both solutions using a peristaltic pump, and temperature control by a heater. The obtained precipitate product is dried after repeating centrifugation and precipitation with pure water (S1304). When lithium, sodium, rubidium, cesium, magnesium, calcium, strontium, barium, or ammonium is used as the target ion, Solution B containing the respective ions in place of potassium may be prepared.

The ion occluding material having a porous coordination polymer containing target ion which does not contain Solution B can be synthesized. For example, the nickel-potassium hexacyanoferrate is synthesized by the method of FIG. 13. Next, the method of FIG. 5 is used. The potassium of the nickel-potassium hexacyanoferrate is released due to the oxidation reaction occurring in S502. Actually, it is said that the potassium ions necessary in order to maintain the crystal structure remain in the crystal. By the structure formula, the nickel-potassium hexacyanoferrate is $KNi[Fe(CN)_6]$. The ion occlusion rate is defined as $K_{1+x}Ni[Fe(CN)_6]$, thus, the ion occlusion rate x is considered to be close to zero. In S504, the reducing agent and a solution containing sodium ions as target ions are used. As an example, an aqueous solution of sodium ascorbate is used. When the ion occlusion rate is adjusted to be 0.5, the structural formula of the compound to be obtained is $KNa_{0.5}Ni[Fe(CN)_6]$. Therefore, the ion occluding material having a porous coordination polymer containing sodium which is the target ion can be obtained.

The porous coordination polymer can occlude various kinds of ions. For example, it is possible to occlude a Group-1 element ion, a Group-2 element ion, a Group-17 element ion, a hydronium ion, or an ammonium ion which are attractive target ions as measurement targets. Further, the corresponding ion sensitive film contains an ionophore such as a crown ether when a cation such as a Group-1 element ion, a Group-2 element ion, a hydronium ion or an ammonium ion is used, and contains the ligand of a cation such as a quaternary ammonium salt when a Group-17 element ion is used.

In the case of the Prussian blue analog, the structure formula of the state in which the target ion was occluded is represented by

$$A_aM_x[M'(CN)_6]_y\square_z.kH_2O.$$

A is one type or a plurality of types of Group-1 elements, Group-2 elements, hydronium, or ammonium, M and M' are one type or a plurality of types of transition metals, M or M' includes at least one of nickel, cobalt, copper, silver, and cadmium, $\square$ is a vacancy in a porous coordination polymer, x and y are greater than zero, and a, z, and k are numbers equal to or greater than zero.

As examples, the nickel-potassium hexacyanoferrate is $KNi[Fe(CN)_6]$, nickel-sodium hexacyanoferrate is $NaNi[Fe(CN)_6]$, nickel-calcium hexacyanoferrate is $CaNi[Fe(CN)_6]$, copper-potassium hexacyanoferrate is $KCu[Fe(CN)_6]$, iron-potassium hexacyanoferrate is $KFe[Fe(CN)_6]$, cobalt-potassium hexacyanoferrate is $KCo[Fe(CN)_6]$, silver-potassium hexacyanoferrate is $KAg_3[Fe(CN)_6]$, and cadmium-potassium hexacyanoferrate is $K_2Cd[Fe(CN)_6].6H_2O$.

FIGS. 14(a) to (d) are diagrams illustrating examples of the cartridge which uses the solid-contact ion-selective electrode of the present invention. The cartridge has, for example, a short side of approximately 15 mm, a long side of approximately 20 mm, and a thickness of approximately 1 mm. FIG. 14(a) represents the state of the cartridge prior to forming the solid-contact ion-selective electrode, and FIG. 14(b) represents a cross-section thereof. A terminal 1402, a wire 1403, and a conductive electrode 1404 made of a conductive material such as carbon, gold or platinum are formed on the substrate 1401 made of an insulating material such as polyethylene terephthalate (PET), polystyrene (PS) or polycarbonate (PC). Furthermore, an insulating film 1405 is formed so as to mainly cover the wire 1403. These are manufactured by printing, sputtering, vapor deposition and the like. FIG. 14(c) represents the state in which the solid-contact ion-selective electrode is formed in the cartridge of FIG. 14(a), and FIG. 14(d) represents a cross-section thereof. An ion occluding material layer 1406 is formed on the conductive electrode 1404, and furthermore, an ion sensitive film 1407 is formed so as to cover the ion occluding material layer 1406. Namely, the cartridge of FIG. 14 plays the same role as when the plurality of ion-selective electrodes of FIG. 1 are arranged. The method for forming the ion occluding material layer 1406 and the ion sensitive film 1407 is not of concern. Coating by a dispenser may be mentioned as an example.

Figure 15:
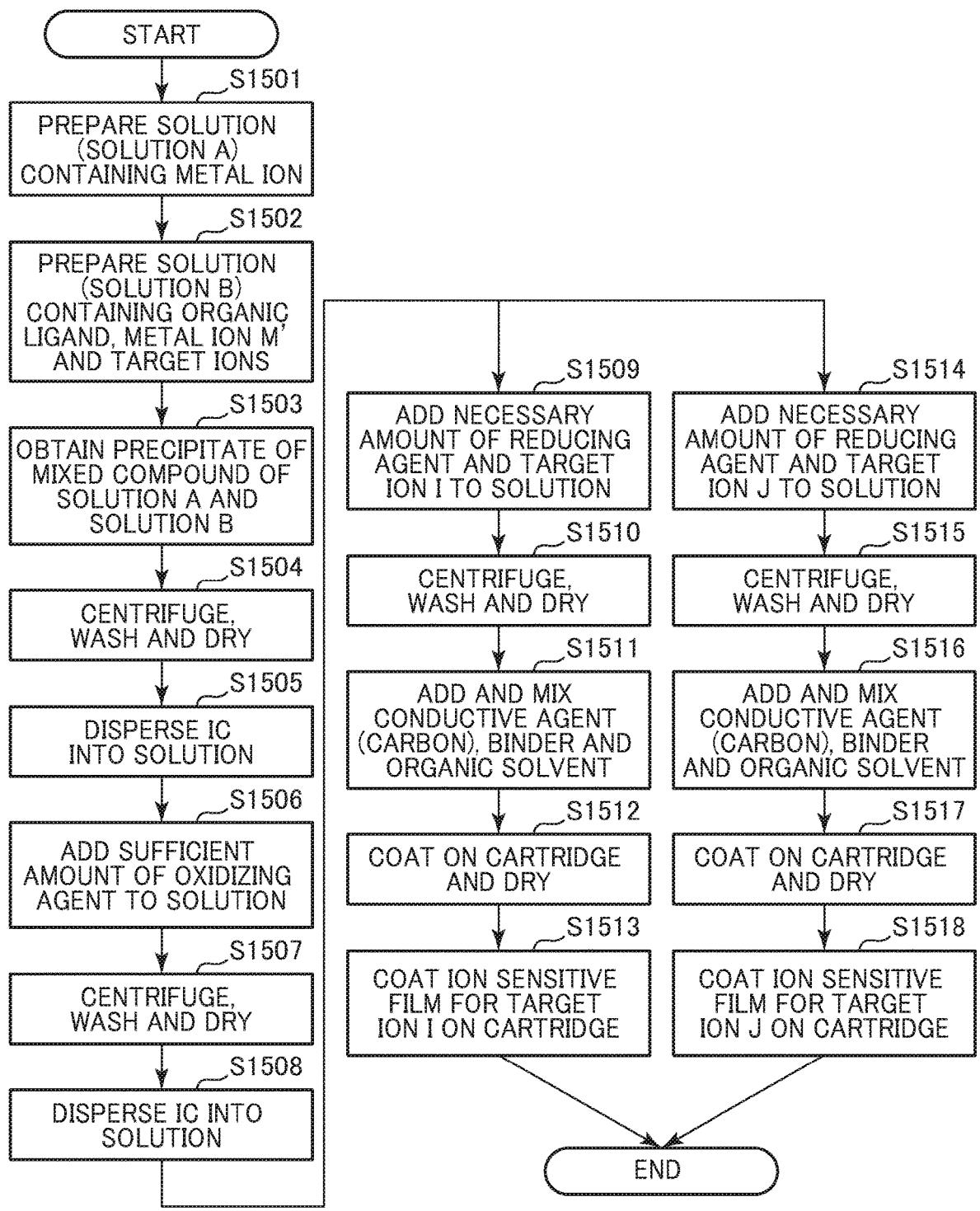
FIG. 15 is a diagram illustrating an example of the steps for manufacturing the cartridge.

FIG. 15 is a diagram illustrating an example of the steps for manufacturing the cartridge of FIG. 14. S1501 to S1504 are steps for synthesizing the ion occluding material including the porous coordination polymer. For example, an aqueous solution of nickel nitrate was prepared as the solution containing nickel ion as the metal ion M (S1501). For the sake of convenience, the aqueous solution of nickel nitrate is referred to as Solution A. Next, an aqueous solution of potassium ferricyanide is prepared as the solution containing cyan as the organic ligand and iron ions as the metal ion M' (S1502). For the sake of convenience, the aqueous solution of potassium ferricyanide is referred to as Solution B. Solution A is mixed with solution B, and a precipitate of the nickel-potassium hexacyanoferrate which is a compound is obtained (S1503). The nickel-potassium hexacyanoferrate is repeatedly centrifuged and precipitated with pure water, and dried to obtain the ion occluding material (S1504).

S1505 to S1507 are steps for making the ion occlusion rate close to 0. The ion occluding material, in this case, the nickel-potassium hexacyanoferrate is dispersed in an aqueous solution (S1505), a sufficient amount of an oxidizing agent, for example, hydrogen peroxide is added (S1506), repeatedly centrifuged and precipitated with pure water, and dried to obtain the ion occluding material in which the ion occlusion rate is close to zero (S1507). The ion occluding material is again dispersed in an aqueous solution (S1508), and then, S1509 to S1510 and S1514 to S1515 are steps for occluding the desired amount of each target ion in the ion occluding material. In S1509, an aqueous solution of sodium ascorbate which is an aqueous solution containing ascorbic acid as a reducing agent and sodium as a target ion I is added, and the desired amount of sodium ions is occluded in the nickel-potassium hexacyanoferrate. In S1510, the nickel-potassium hexacyanoferrate is repeatedly centrifuged and precipitated, and then dried to obtain the ion occluding material which occludes sodium. In S1514, an aqueous solution of potassium ascorbate which is an aqueous solution containing ascorbic acid as a reducing agent and potassium as a target ion J is added, and the desired amount of potassium ions is occluded in the nickel-potassium hexacyanoferrate. In S1515, the nickel-potassium hexacyanoferrate is repeatedly centrifuged and precipitated, and then dried to obtain the ion occluding material which occludes potassium.

The obtained ion occluding material (weight ratio 85%), graphite (weight ratio 10%) as the conductive agent, and polyvinylidene fluoride (weight ratio 5%) as the bonding agent are dissolved in N-methyl pyrrolidone (S1511 and S1516), coated and dried on the conductive electrode 1404 to form the ion occluding material layer 1406 (S1512 and S1517). The ion sensitive film for the target ion is furthermore coated and dried on the ion occluding material layer 1406 (S1513 and S1518) to obtain the cartridge.

Even though the cartridge includes the ion occluding material layer which occludes different target ions, the ion occluding material having the porous coordination polymer, for example, nickel hexacyanoferrate and copper hexacyanoferrate can occlude a plurality of types of ions, thus, a part of the manufacturing steps can be common. As a result, not only a cost reduction is possible due to the simplification of the manufacturing steps, but the labor involved in confirming the performance of the synthesized substances and the labor involved in optimizing the manufacturing steps can be reduced. Even though sodium and potassium were exemplified in the present embodiment, the present invention can also be applied to ions which can be occluded by the ion occluding material having the porous coordination polymer, for example, lithium, sodium, ammonium, magnesium, calcium, strontium, and barium in the same manner. Even though the present embodiment exemplified the case where the ion-selective electrodes of different target ion to be measured are mounted on the same cartridge in a mixed manner, it is not always necessary that the ion-selective electrodes are mounted on the same cartridge in a mixed manner. For example, even if the cartridge having only the potassium ion-selective electrode and the cartridge having only the sodium ion-selective electrode are manufactured separately, it is still possible that some of the steps can be common, but the labor involved in confirming the performance of the synthesized substances and the labor involved in optimizing the manufacturing steps can be reduced in the same manner as shown in FIG. 15.

FIG. 16 is a diagram illustrating another example of the steps for manufacturing the cartridge of FIG. 14. S1601, S1602 to S1604 and S1609 to S1611 are the steps for synthesizing the ion occluding material including the porous coordination polymer. For example, an aqueous solution of nickel nitrate is prepared as the solution containing nickel ion as the metal ion M (S1601). For the sake of convenience, the aqueous solution of nickel nitrate is referred to as Solution A. Next, an aqueous solution of sodium ferrocyanide is prepared as the solution containing cyan as the organic ligand, iron ions as the metal ion M', and sodium as the target ion (S1602). For the sake of convenience, the aqueous solution of sodium ferrocyanide is referred to as Solution B. Solution A is mixed with Solution B, and the precipitation of nickel-sodium hexacyanoferrate which is a compound is obtained (S1603). The nickel-sodium hexacyanoferrate is repeatedly centrifuged and precipitated with pure water, and dried to obtain the ion occluding material (S1604).

At the same time, an aqueous solution of potassium ferrocyanide is prepared as the solution containing cyan as the organic ligand, iron ion as the metal ion M", and potassium as the target ion (S1609). For the sake of convenience, the aqueous solution of potassium ferricyanide is referred to as Solution C. Solution A is mixed with Solution C to obtain a precipitate of the nickel-potassium hexacyanoferrate which is a compound (S1610). The nickel-potassium hexacyanoferrate is repeatedly centrifuged and precipitated with pure water, and dried to obtain the ion occluding material (S1611).

S1605 and S1612 are steps for adjusting the ion occlusion rate, and the steps represented by S301 to S305 in FIG. 3, the steps represented by S401 to S406 in FIG. 4, and the steps represented by S501 to S505 in FIG. 5 can be used. The obtained ion occluding material (weight ratio 85%), graphite (weight ratio 10%) as the conductive agent, and polyvinylidene fluoride (weight ratio 5%) as the bonding agent are dissolved in N-methyl pyrrolidone (S1606 and S1613), and coated and dried on the conductive electrode 1404 to form the ion occluding material layer 1406 (S1607 and S1614). An ion sensitive film for the target ion is further coated and dried on the ion occluding material layer 1406 (S1608 and S1615) to obtain the cartridge.

FIG. 17 is a diagram illustrating another example of the method for adjusting the ion occlusion rate of the porous coordination polymer. For example, the aqueous solution of nickel nitrate is prepared as a solution containing nickel ion (S1701). For the sake of convenience, the aqueous solution of nickel nitrate is referred to as Solution A. Next, a mixed liquid of an aqueous solution of potassium ferrocyanide and an aqueous solution of potassium ferricyanide is prepared as the aqueous solution containing the organic ligand, the iron ions and the potassium ions (S1702). For the sake of convenience, the mixed liquid is referred to as Solution B. At this time, the iron which is a transition metal is present in Solution B as a mixture of divalent ions and trivalent ions. If Solution A is mixed with Solution B, the nickel-potassium hexacyanoferrate can be obtained (S1703). At this time, the potassium ion occlusion rate is determined by the chemical equilibrium of the solution after mixing. The nickel-potassium hexacyanoferrate is repeatedly centrifuged and precipitated with pure water, and dried to obtain the porous coordination polymer (S1704).

The potassium ion occlusion rate of the obtained porous coordination polymer is measured (S1705), and it is judged whether or not it is the desired ion occlusion rate (S1706). If the potassium ion occlusion rate is the desired ion occlusion rate, the obtained porous coordination polymer is used as the material of the ion-selective electrode. When the occlusion rate is different than the desired occlusion rate, the mixing ratio of divalent iron and trivalent iron in Solution B is adjusted, for example, by adjusting the mixing ratio of the aqueous solution of potassium ferrocyanide and the aqueous solution of potassium ferricyanide of Solution B, and performing the synthesis again. Alternatively, the mixing ratio of Solution A and Solution B may also be adjusted. Once the synthesis conditions are determined, it is not necessary to perform the measurement of the ion occlusion rate thereafter. As the determination criterion of the ion occlusion rate, for example, a determination criterion which is acceptable can be adopted as long as the ion occlusion rate is in a range of 0.1 to 0.9. The determination criterion which sets the ion occlusion rate from 0.2 to 0.8 is acceptable, the determination criterion which sets the ion occlusion rate from 0.3 to 0.7 is acceptable, the determination criterion which sets the ion occlusion rate from 0.4 to 0.6 is acceptable and the like may be adopted as a more stringent determination criterion.

Figure 20:
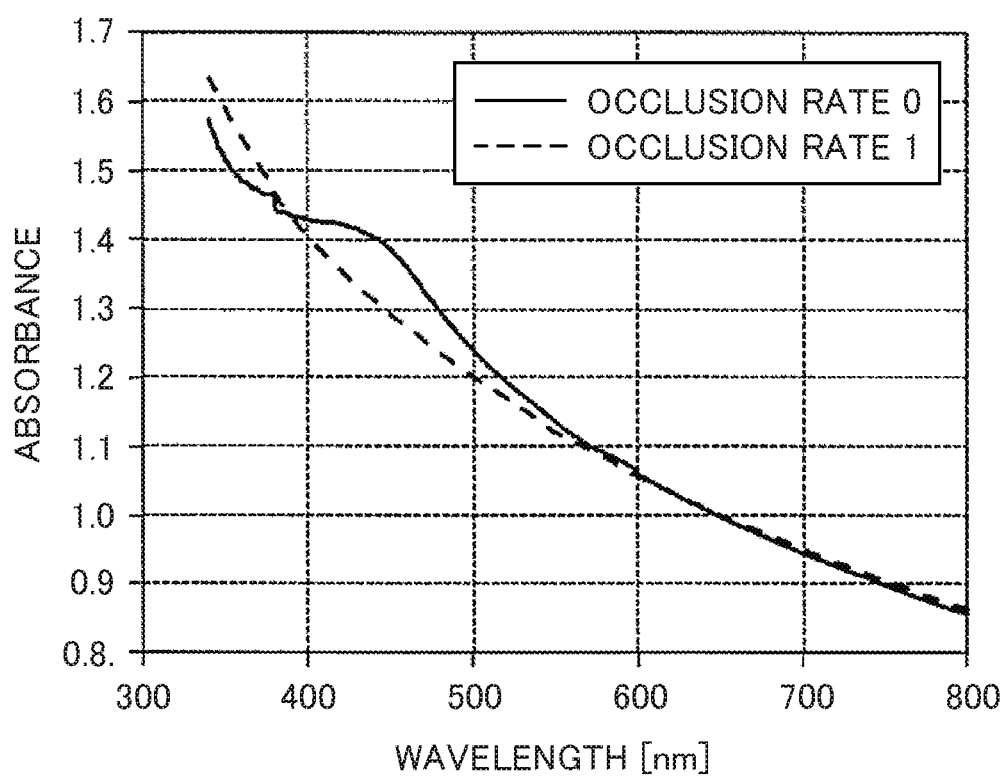
FIG. 20 is a diagram comparatively illustrating the absorption spectra in the cases of occlusion rates 0 and 1 in the nickel-potassium hexacyanoferrate.

The measurement of the ion occlusion rate can use elemental analysis as described in, for example, J. Am. Chem. Soc. 2000, 122, 6648-6652. Further, the potential response to the application of a constant current such as in FIG. 11 can also be used. Further, in some cases it is also possible to determine the ion occlusion rate by measuring the absorption spectrum. FIG. 20 is a diagram comparatively illustrating the absorption spectra in the cases where the occlusion rate in the nickel-potassium hexacyanoferrate is 0 and 1. The peak which can be observed in the vicinity of 440 nm at the occlusion rate of 0 disappears at the occlusion rate of 1. The occlusion rate can be measured using the intensity of this peak.

Figure 18A:
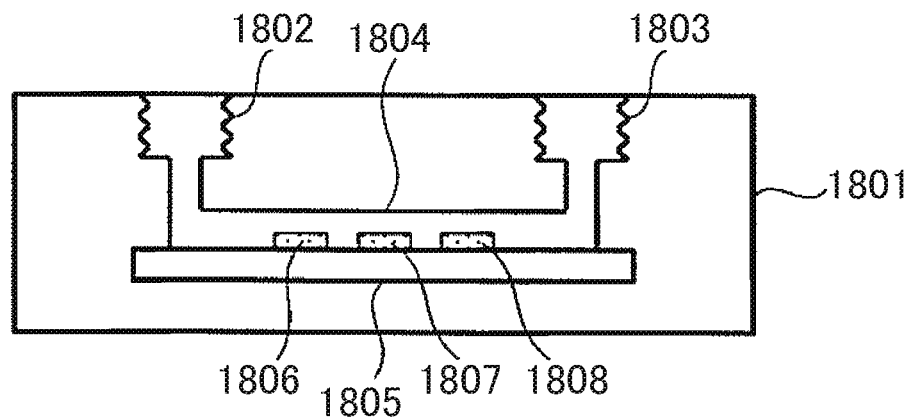
FIGS. 18A and 18B are diagrams illustrating an example of the cartridge with a flow channel which uses the solid-contact ion-selective electrode.
Figure 18B:
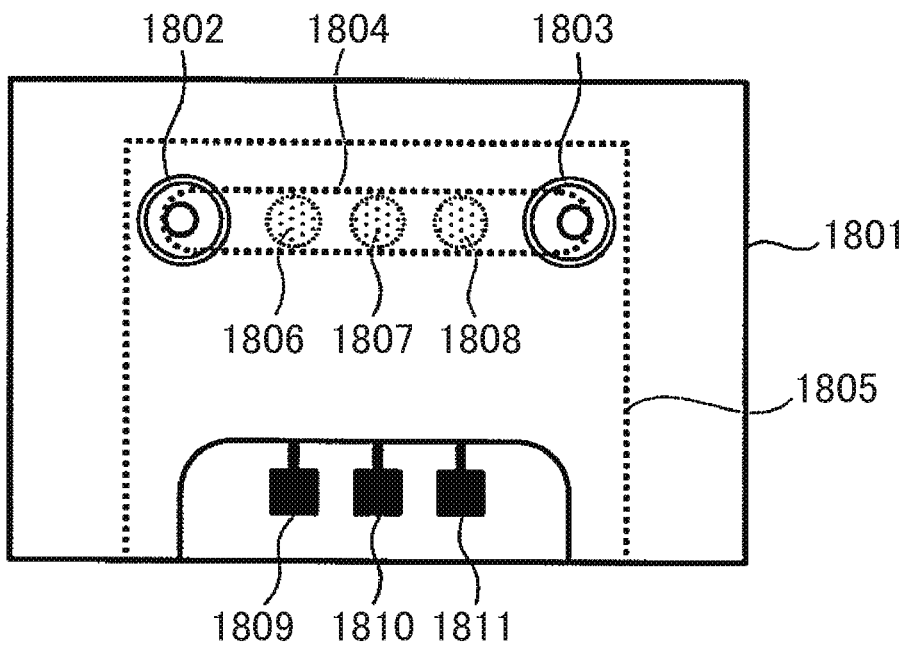

FIGS. 18(a) and (b) are diagrams illustrating an example of the cartridge with the flow channel which employs the solid-contact ion-selective electrode. FIG. 18(a) is the diagram seen from the side surface, and FIG. 18(b) is the diagram seen from the top surface. The cartridge with the flow channel 1801 has a flow channel 1804, an inlet 1802 and an outlet 1803 are connected to the flow channel 1804. A cartridge 1805 as exemplified in FIG. 14 without a flow channel is embedded in the cartridge with the flow channel 1801, and a chlorine ion-selective electrode 1806, a potassium ion-selective electrode 1807, and a sodium ion-selective electrode 1808 are disposed in the flow channel 1804. Terminals 1809 to 1811 corresponding to the respective electrodes are exposed to the outside of the cartridge with the flow channel 1801.

Figure 19:
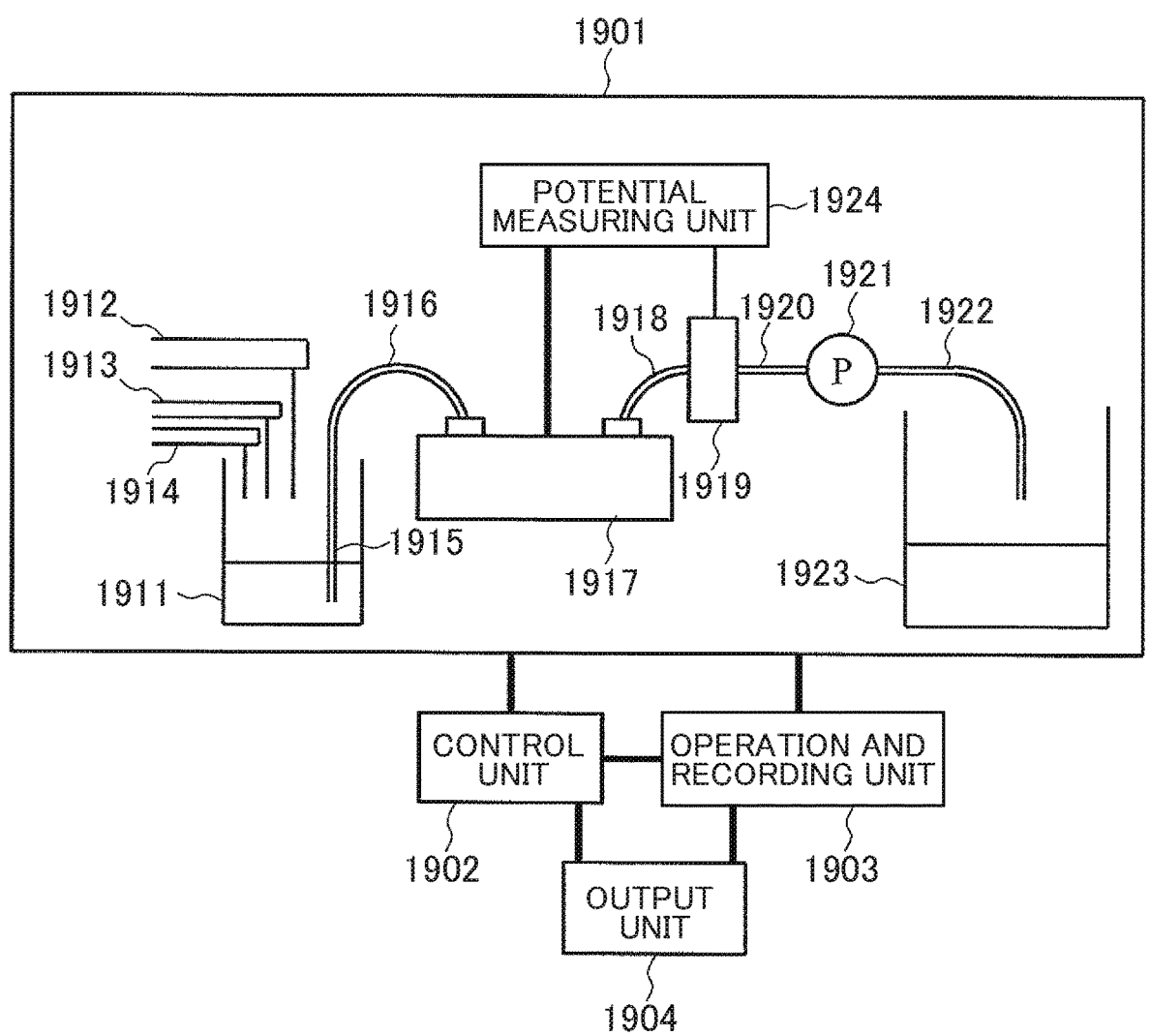
FIG. 19 is a schematic diagram illustrating an example of an electrolyte concentration measuring device which uses the cartridge with the flow channel.

FIG. 19 is a schematic diagram illustrating an example of an electrolyte concentration measuring device which uses the cartridge with the flow channel. The electrolyte concentration measuring device includes a measuring unit 1901, a control unit 1902, an operation and recording unit 1903, and an output unit 1904. The control unit 1902, the operation and recording unit 1903, and the output unit 1904 are connected to the measuring unit 1901.

The control unit 1902 controls each constitutional element of the measuring unit 1901 described below. The operation and recording unit 1903 calculates the ion concentration of the measurement object from the potential and the like measured in the measuring unit 1901. The output unit 1904 is a display or a printer and the like.

The control unit 1902 and the operation and recording unit 1903 may be realized using a general purpose computer, and may also be realized as the function of a program executed by the computer. Namely, the processing of the control unit 1902 and the operation and recording unit 1903 described below may be realized by storing a program code in a storage unit such as a memory and executing each program code by a processor such as a CPU. Note that, the control unit 1902 and the operation and recording unit 1903 may be constituted by hardware such as a dedicated circuit board.

The measuring unit 1901 includes a dilution vessel 1911, a specimen dispensing nozzle 1912, a diluent dispensing nozzle 1913, a reference liquid dispensing nozzle 1914, a sample solution suction nozzle 1915, a pipe 1916, a cartridge with the flow channel 1917 as exemplified in FIG. 18, a pipe 1918, a reference electrode 1919, a pipe 1920, a pump 1921, a pipe 1922, a waste liquid reservoir 1923, and a potential measuring unit 1924. In the measuring unit 1901, the sample solution suction nozzle 1915, the pipe 1916, the pump 1921, and the pipe 1922 can be used as a sample introduction part for introducing the sample solution containing the electrolyte.

In the measuring unit 1901, the sample solution is introduced to the cartridge 1917 and the reference electrode 1919 using the sample introduction part. Moreover, the potential difference between the electrodes is measured in a state in which the sample solution was introduced. The detailed configuration will be described below.

The specimen dispensing nozzle 1912 dispenses and discharges a specimen such as blood or urine to the dilution vessel 1911, and the diluent dispensing nozzle 1913 dispenses and discharges the diluent to the dilution vessel 1911. Further, the reference liquid dispensing nozzle 1914 dispenses and discharges a reference liquid of a known concentration into the dilution vessel 1911. The sample solution suction nozzle 1915 is vertically movable, and sucks the solution in the dilution vessel 1911 by the driving force of the pump 1921. The sucked solution is introduced into the cartridge 1917 and the reference electrode 1919 through the pipes 1916, 1918, and furthermore, is discharged through the pipes 1920, 1922. The terminal of the cartridge 1917 and the reference electrode 1919 are connected to the potential measuring unit 1924.

For example, a tris-borate buffer and a bis-tris-borate buffer containing no target ion to be measured is used for the diluent. As the reference liquid, a target ion to be measured in the range of a blood concentration reference value, for example, a solution having about 140 mM of sodium, 4 mM of potassium, and 100 mM of chlorine can be used as a specimen and diluted at a dilution ratio by a certain diluent.

Note that, the present invention is not limited to the aforementioned embodiments and includes various modifications. For example, although the aforementioned embodiments have been specifically described to clearly illustrate the present invention, the present invention need not include all of the configurations described in the embodiments. Further, it is possible to replace a part of a structure of an embodiment with a structure of another embodiment, and, it is also possible to add, to a structure of an embodiment, a structure of another embodiment. Further, it is also possible to, for a part of a structure of each embodiment, add, remove, or substitute a structure of another embodiment.

LIST OF REFERENCE SIGNS 101 ion sensitive film
102 ion occluding material layer
103 conductive electrode
104 conductive wire
105 terminal
106 cartridge
601 ion-selective electrode
602 reference electrode
603 potentiometer
604 sample solution
1401 substrate
1402 terminal
1403 wire
1404 conductive electrode
1405 insulating film
1406 ion occluding material layer
1407 ion sensitive film
1801 cartridge with a flow channel
1804 flow channel
1805 cartridge
1806 chlorine ion-selective electrode
1807 potassium ion-selective electrode
1808 sodium ion-selective electrode
1901 measuring unit
1917 cartridge with a flow channel
1919 reference electrode

The invention claimed is:

1. An ion-selective electrode comprising:
an ion sensitive film having a Group-1 element ion, a Group-2 element ion, a hydronium ion or an ammonium ion as a target ion;
an ion occluding material layer; and
a conductive electrode,
wherein an ion occluding material contained in the ion occluding material layer occludes the target ion,
the ion occluding material being a Prussian blue analog represented by structure formula $A_aM_x[M'(CN)_6]_y\square_z \cdot kH_2O$, wherein
A is at least one of a Group-1 element, a Group-2 element, hydronium, or ammonium,
M and M' are at least one type of transition metals,
M or M' includes at least one of nickel, cobalt, copper, silver, and cadmium,
$\square$ is a vacancy in a porous coordination polymer, and
x and y are greater than zero; and a, z, and k are numbers equal to or greater than zero.

2. A cartridge comprising a plurality of ion-selective electrodes,
wherein when one of the ion-selective electrodes is made as an ion-selective electrode A, and the other ion-selective electrode is made as an ion-selective electrode B,
the ion-selective electrode A and the ion-selective electrode B comprising:
an ion sensitive film having a Group-1 element ion, a Group-2 element ion, a Group-17 element ion, a hydronium ion or an ammonium ion as a target ion;
an ion occluding material layer; and
a conductive electrode, wherein
an ion occluding material contained in the ion occluding material layer occludes the target ion,
the ion occluding material is a porous coordination polymer, and
the target ion of the ion-selective electrode A is different from the target ion of the ion-selective electrode B,
the ion occluding material being a Prussian blue analog represented by structure formula $A_aM_x[M'(CN)_6]_y\square_z \cdot kH_2O$, wherein
A is at least one type of Group-1 elements, Group-2 elements, hydronium, or ammonium,
M and M' are at least one type of transition metals,
M or M' includes at least one of nickel, cobalt, copper, silver, and cadmium,
$\square$ is a vacancy in a porous coordination polymer, and
x and y are greater than zero; and a, z, and k are numbers equal to or greater than zero.

3. A method of manufacturing an ion-selective electrode, wherein the ion-selective electrode includes an ion sensitive film having a Group-1 element ion, a Group-2 element ion, a Group-17 element ion, a hydronium ion or an ammonium ion as a target ion, an ion occluding material layer, and a conductive electrode, and the ion occluding material layer includes a porous coordination polymer, the method comprising:
a step of manufacturing the porous coordination polymer including:
a step of mixing Solution A containing a transition metal M with Solution B containing a transition metal M'; and
a step of recovering the porous coordination polymer from a product of the mixture,
the transition metal M and the transition metal M' are the same or different,
at least Solution A contains the transition metal M in at least two different ions that have different valences, and
at least one of Solution A and Solution B contains an organic ligand;
adhering the ion occluding material layer to the conductive electrode; and
adhering the ion sensitive film to the ion occluding material layer.

4. The method of manufacturing the ion-selective electrode according to claim 3, comprising:
a step of examining a state of the porous coordination polymer recovered from the product of the mixture; and
a step of adjusting a mixing ratio of the different ions of the transition metal M contained in Solution A or the mixing ratio of Solution A and Solution B based on the state of the porous coordination polymer.

5. The method of manufacturing the ion-selective electrode according to claim 4,
wherein elemental analysis is performed in the step of examining the state of the recovered porous coordination polymer.

6. The method of manufacturing the ion-selective electrode according to claim 4,
wherein the step of examining the state of the porous coordination polymer includes measuring a voltage potential of the ion-selective electrode.

7. The method of manufacturing the ion-selective electrode according to claim 4,
wherein absorbance is measured in the step of examining the state of the porous coordination polymer.

8. The method of manufacturing the ion-selective electrode according to claim 4,
wherein the step of examining the state of the porous coordination polymer includes determining whether an ion occlusion ratio of the ion occluding material layer, which is a ratio of ions occluded by the ion occluding material to all ions in the porous coordination polymer, is in a range of 0.1 to 0.9.

9. A method of manufacturing an ion-selective electrode, wherein the ion-selective electrode includes an ion sensitive film having a Group-1 element ion, a Group-2 element ion, a Group-17 element ion, a hydronium ion or an ammonium ion as a target ion, an ion occluding material layer, and a conductive electrode, the method comprising:
a step of manufacturing the ion occluding material layer including:
a step of dispersing an ion occluding material into a solution;
a step of adding an oxidation-reduction substance to the solution in which the ion occluding material is dispersed; and
a step of recovering the ion occluding material from the solution in which the oxidation-reduction substance is added, in which an ion occlusion ratio, which is a ratio of ions occluded by the ion occluding material to all ions in the oxidation-reduction substance, is adjusted by the addition of the oxidation-reduction substance;
adhering the ion occluding material layer to the conductive electrode; and
adhering the ion sensitive film to the ion occluding material layer.

10. The method of manufacturing the ion-selective electrode according to claim 9,
wherein the ion occlusion rate of the ion occluding material layer is adjusted to a range of 0.1 to 0.9.

11. A method of manufacturing an ion-selective electrode, wherein the ion-selective electrode includes an ion sensitive film having a Group-1 element ion, a Group-2 element ion, a Group-17 element ion, a hydronium ion or an ammonium ion as a target ion, an ion occluding material layer, and a conductive electrode, the method comprising:
a step of manufacturing the ion occluding material layer including:
a step of preparing a first ion occluding material in which an ion occlusion rate of the target ion is a first value;
a step of preparing a second ion occluding material in which the ion occlusion rate of the target ion is a second value; and
a step of mixing the first ion occluding material with the second ion occluding material;
adhering the ion occluding material layer to the conductive electrode; and
adhering the ion sensitive film to the ion occluding material layer.

12. The method of manufacturing the ion-selective electrode according to claim 11,
wherein the ion occlusion ratio of the ion occluding material layer is adjusted to a range of 0.1 to 0.9.

* * * * *